United States Patent
Garrison

(10) Patent No.: US 11,739,653 B2
(45) Date of Patent: *Aug. 29, 2023

(54) CIRCUMFERENTIAL SEAL ASSEMBLY WITH ADJUSTABLE SEATING FORCES

(71) Applicant: Stein Seal Company, Kulpsville, PA (US)

(72) Inventor: Glenn M. Garrison, Perkiomenville, PA (US)

(73) Assignee: Stein Seal Company, Kuipsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,450

(22) Filed: Jan. 18, 2022

(65) Prior Publication Data

US 2022/0136400 A1 May 5, 2022

Related U.S. Application Data

(63) Continuation-in-part of application No. 17/495,084, filed on Oct. 6, 2021, which is a continuation of
(Continued)

(51) Int. Cl.
- *F01D 11/00* (2006.01)
- *F16J 15/24* (2006.01)
- *F16J 15/44* (2006.01)

(52) U.S. Cl.
CPC ............. *F01D 11/003* (2013.01); *F16J 15/24* (2013.01); *F16J 15/442* (2013.01); *F05D 2220/32* (2013.01); *F05D 2240/55* (2013.01)

(58) Field of Classification Search
CPC . F05D 2240/55; F05D 2220/32; F16J 15/442; F16J 15/24; F01D 11/003
See application file for complete search history.

(56) References Cited

U.S. PATENT DOCUMENTS 3,122,374 A * 2/1964 McGahan ............... F04D 29/14
277/408
3,575,424 A * 4/1971 Taschenberg .......... F16J 15/442
277/411

(Continued)

OTHER PUBLICATIONS

International Search Report dated Apr. 28, 2023 issued by the Korea Intellectual Property Office under Application No. PCT/US2023/010006 (3 pages).

(Continued)

*Primary Examiner* — Eugene G Byrd
(74) *Attorney, Agent, or Firm* — Michael Crilly, Esquire

(57) ABSTRACT

A circumferential seal assembly for use between a higher pressure side and a lower pressure side is presented. The seal assembly includes a primary sealing ring, a second sealing ring, a third sealing ring, and an insert. The primary sealing ring sealingly engages both a face sealing surface along a housing and a radial sealing surface along a rotatable element. The primary sealing ring, the second sealing ring, and the third sealing ring cooperate, in combination with the housing, the rotatable element, and/or the insert, both to define and to separate a first cavity at the higher pressure side and a second cavity at the lower pressure side. In some embodiments, the second sealing ring sealingly engages a face of the primary sealing ring. In other embodiments, the second sealing ring sealingly engages a circumferential surface of the primary sealing ring.

51 Claims, 25 Drawing Sheets

Related U.S. Application Data application No. 16/491,189, filed as application No. PCT/US2017/030834 on May 3, 2017, now Pat. No. 11,168,573.

(56) References Cited

U.S. PATENT DOCUMENTS

| | | | | |
|---|---|---|---|---|
| 3,912,342 | A * | 10/1975 | Schirm | F16J 15/441 384/131 |
| 5,039,115 | A * | 8/1991 | Hebert | F16J 15/406 277/580 |
| 5,058,904 | A * | 10/1991 | Nevola | F16J 15/30 277/399 |
| 5,217,232 | A * | 6/1993 | Makhobey | F16J 15/30 277/411 |
| 5,509,664 | A * | 4/1996 | Borkiewicz | F16J 15/442 277/543 |
| 5,558,341 | A * | 9/1996 | McNickle | F16J 15/3488 277/400 |
| 6,132,168 | A * | 10/2000 | Kovaleski | F16J 15/443 415/113 |
| 6,692,006 | B2 * | 2/2004 | Holder | F16J 15/442 277/346 |
| 7,931,277 | B2 * | 4/2011 | Garrison | F16J 15/441 277/400 |
| 8,083,235 | B2 * | 12/2011 | Azibert | F16J 15/54 277/371 |
| 9,551,232 | B2 * | 1/2017 | Lebigre | F16J 15/3412 |
| 11,434,828 | B2 * | 9/2022 | Miller | F01D 25/183 |
| 2010/0237566 | A1 * | 9/2010 | Balsells | F16J 15/3236 277/637 |
| 2013/0200573 | A1 * | 8/2013 | Garrison | F16J 9/24 137/1 |
| 2015/0167846 | A1 * | 6/2015 | Haynes | F16J 15/34 277/350 |
| 2016/0069269 | A1 * | 3/2016 | Hyland | F16J 15/442 277/411 |
| 2020/0032668 | A1 | 1/2020 | Garrison | |
| 2022/0136400 | A1 | 5/2022 | Garrison | |

OTHER PUBLICATIONS

Written Opinion dated Apr. 28, 2023 issued by the Korea Intellectual Property Office under Application No. PCT/US2023/010006 (4 pages).

* cited by examiner

*Fig. 20a*
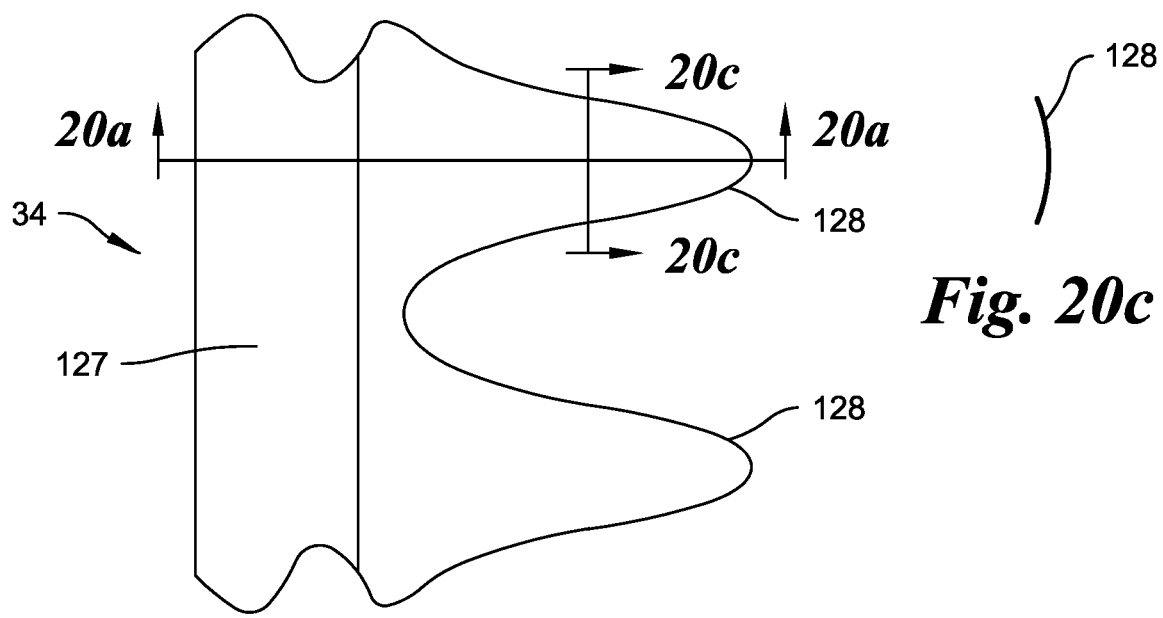
*Fig. 20b*
*Fig. 20c*

CIRCUMFERENTIAL SEAL ASSEMBLY WITH ADJUSTABLE SEATING FORCES

CROSS REFERENCE TO RELATED APPLICATIONS

This application is a continuation-in-part of U.S. patent application Ser. No. 17/495,084 filed Oct. 6, 2021 entitled Circumferential Seal Assembly with Adjustable Seating Forces which is a continuation of U.S. patent application Ser. No. 16/491,189 filed Sep. 5, 2019 entitled Improved Circumferential Seal Assembly with Adjustable Seating Forces now U.S. Pat. No. 11,168,573 which is a National Stage entry of PCT Application No. PCT/US2017/030834 filed May 3, 2017 entitled Improved Circumferential Seal Assembly with Adjustable Seating Forces wherein all applications are hereby incorporated herein in their entirety by reference thereto.

GOVERNMENT SPONSORED RESEARCH AND DEVELOPMENT

None.

BACKGROUND OF THE DISCLOSURE

1. Field

The disclosure generally relates to a circumferential seal assembly for controlling flow of a fluid between adjoining compartments within a turbine engine and more particularly is concerned, for example, with minimizing flow across a sealing surface along a rotatable shaft or a runner that extends into one compartment with a fluid at a higher pressure and into another compartment with another fluid at a lower pressure.

2. Background

A turbine engine typically includes a housing that defines compartments therein and a rotatable shaft with or without a runner that passes through the compartments. Adjoining compartments typically separate one fluid from another fluid. In one example, one compartment may include a gas, such as combustion byproducts, and another may include a liquid, such as a lubricant. Mixture between the liquid and the gas within one compartment could compromise the integrity of the sealing assembly thereby adversely effecting performance and function of a gas turbine. As such, adjoining compartments must be isolated from one another by means of a sealing system that prevents one fluid, either a liquid or a gas, from migrating along a rotatable surface and entering a compartment so as to mix with another fluid therein. A circumferential seal is often implemented to avoid mixing between fluids and the problems caused thereby.

Referring now to FIG. 1, an exemplary circumferential seal 1 known within the art is shown with a garter spring 2 disposed within a groove 23 about the circumference of the circumferential seal 1 and a coil spring 8 disposed within a pocket 24 at one side of the circumferential seal 1. A typical circumferential seal 1 is composed of two or more ring segments with coil springs 8 and pockets 24 along each segment. The circumferential seal 1 is situated between a higher pressure side 21 at a higher pressure $P_1$ and a lower pressure side 22 at a lower pressure $P_0$. The garter spring 2 urges the circumferential seal 1 in the direction of a radial sealing surface 19. The radial sealing surface 19 may be disposed along the outer circumference of a shaft or a component attached to a shaft, one non-limiting example of the latter being a runner. The coil spring 8 urges the circumferential seal 1 in the direction of a forward sealing surface 11 disposed along the interior of a housing (not shown) adjacent to the circumferential seal 1.

A forward face 3 of the circumferential seal 1 may sealingly engage the forward sealing surface 11 via cooperation between a radial bleed groove 4, a face groove 5, and a face dam 6. A forward pressure 7 is communicated across the forward face 3 via a fluid contacting the circumferential seal 1. The forward pressure 7 imparts a forward face force $F_F$ in the direction of the higher pressure side 21.

An aft pressure 10 is communicated across an aft face 9 via a fluid contacting the circumferential seal 1. The aft pressure 10 imparts an aft face force $F_A$ in the direction of the lower pressure side 22. The coil spring 8 also imparts a spring force $F_S$ directed toward the lower pressure side 22.

The total of the aft face force $F_A$ and the spring force $F_S$ is greater than or equal to the forward face force $F_F$ so that the forward face 3 contacts and sealingly engages the forward sealing surface 11. In preferred embodiments, the force differential should be minimized to permit inward and outward movement of ring segments so that the circumferential seal 1 contracts and expands as required by conditions within a turbine engine.

An inward pressure 14 is communicated across an outer circumferential surface 12 via a fluid contacting the circumferential seal 1. The inward pressure 14 imparts an inward radial force $F_I$ in the direction of the radial sealing surface 19. The garter spring 2 also imparts a spring force $F_G$ directed toward the radial sealing surface 19.

An inner circumferential surface 13 of the circumferential seal 1 may sealingly engage the radial sealing surface 19 via cooperation between a seal dam 15, a bore groove 16, and an axial bleed groove 17. The seal dam 15 is biased toward the lower pressure side 22. An outward pressure 18 is communicated across the inner circumferential surface 13 via a fluid contacting the circumferential seal 1. The outward pressure 18 imparts an outward radial force $F_O$ in the direction away from the radial sealing surface 19.

The total of the inward radial force $F_I$ and the spring force $F_G$ should be greater than or equal to the outward radial force $F_O$ so that the inner circumferential surface 13 sealingly engages the radial sealing surface 19, preferably via a thin film 20. In other preferred embodiments, the force differential should be minimized to permit inward and outward movement of ring segments so that the circumferential seal 1 contracts and expands as required by conditions within a turbine engine.

Performance and efficiency enhancements to turbine engines often require higher pressures and temperatures within the higher pressure side 21 and higher rotational speeds by the shaft and the radial sealing surface 19 thereon. High pressures and temperatures are problematic in that it is more challenging to properly balance the forward face force $F_F$ with respect to both the aft face force $F_A$ and the spring force $F_S$ and both the inward radial force $F_1$ and the spring force $F_G$ with respect to the outward radial force $F_O$ over a wider range of operating conditions.

For example, a circumferential seal 1 optimized for pressures and temperatures during flight may allow the aft face force $F_A$ to greatly exceed the forward face force $F_F$ and/or the inward radial force $F_I$ to greatly exceed the outward radial force $F_O$ when engine conditions require higher shaft speeds and pressures, such as at takeoff. The resulting imbalance effectively pins the circumferential seal 1 onto and against the face sealing surface 11 and the radial sealing surface 19 causing excessive wear to and heating of the circumferential seal 1.

Wear and heating are further problematic in turbine engines that derive greater performance and higher efficiency via higher shaft speeds. At extreme conditions, a circumferential seal 1 may permit hot gases from the higher pressure side 21 to freely flow into the lower pressure side 22 so as to mix with and to cook oil lubricants therein. The end results could include an engine fire and/or flow conditions in the direction of the sump that blow lubricating oil away from the seal and the sealing surface.

Accordingly, what is required is a circumferential seal assembly interposed between a pair of compartments that minimizes leakage across a face sealing surface and a radial sealing surface within a turbine engine operating at higher shaft speeds and pressures.

Accordingly, what is also required is a circumferential seal assembly that reduces seating forces along a face sealing surface and a radial sealing surface within a turbine engine operating at higher shaft speeds and pressures.

SUMMARY

An object of the disclosure is to provide a circumferential seal assembly interposed between a pair of compartments that minimizes leakage across a face sealing surface and a radial sealing surface within a turbine engine operating at higher shaft speeds and pressures.

Another object of the disclosure is to provide a circumferential seal assembly that reduces seating forces along a face sealing surface and a radial sealing surface within a turbine engine operating at higher shaft speeds and pressures.

In accordance with an embodiment of the disclosure, the circumferential seal assembly includes a primary sealing ring, a second sealing ring, a third sealing ring, and an insert. The second sealing ring includes a ring portion interposed between a pair of cylindrical portions. The second sealing ring is radially interposed between a housing and a rotatable element. The primary sealing ring is radially interposed between one cylindrical portion and the rotatable element. The primary sealing ring at one end sealingly engages a face sealing surface along the housing. The primary sealing ring sealingly engages a radial sealing surface along an inner circumferential surface of the rotatable element. The ring portion sealingly engages a face surface at another end of the primary sealing ring. The third sealing ring sealingly engages the other cylindrical portion. The insert includes an outward flange extending from an annular ring portion. The outward flange is axially interposed between the ring portion and the third sealing ring. The third sealing ring is radially interposed between the annular ring portion and other cylindrical portion. The third sealing ring sealingly engages a flange face of the outward flange. The insert and the third sealing ring define a first cavity. The primary sealing ring, the second sealing ring, the insert, and the housing define a second cavity. The insert and the second sealing ring cooperate to separate the first cavity and the second cavity.

In accordance with other embodiments, the rotatable element is a shaft.

In accordance with other embodiments, the rotatable element is a runner disposed along a shaft.

In accordance with other embodiments, in use, the first cavity is suitable to be at a higher pressure and the second cavity is suitable to be at a lower pressure.

In accordance with other embodiments, the primary sealing ring includes a seal bore dam which sealingly engages the radial sealing surface adjacent to the second sealing ring.

In accordance with other embodiments, the housing includes at least one exhaust port which permits a fluid, in use, to exit the second cavity.

In accordance with other embodiments, the primary sealing ring comprises a carbon.

In accordance with other embodiments, the second sealing ring comprises a metal.

In accordance with other embodiments, the third sealing ring comprises one of a metal or a carbon.

In accordance with other embodiments, in use, a fluid traverses the radial sealing surface adjacent to the second sealing ring before entering the second sealing ring.

In accordance with other embodiments, the fluid is communicated from the second sealing ring into the primary sealing ring whereafter the fluid is directed toward the face sealing surface.

In accordance with other embodiments, the fluid is communicated from the second sealing ring into the primary sealing ring whereafter the fluid is directed toward the radial sealing surface.

In accordance with other embodiments, in use, a fluid enters the primary sealing ring adjacent to the radial sealing surface whereafter the fluid enters the second cavity.

In accordance with other embodiments, in use, a fluid originating from the higher pressure side traverses the first cavity and passes between the third sealing ring and the insert and between the insert and the second sealing ring before entering the second cavity.

In accordance with other embodiments, the second sealing ring is axially biased in direction of the primary sealing ring via at least one spring.

In accordance with other embodiments, the primary sealing ring is axially biased toward the face sealing surface via the second sealing ring.

In accordance with other embodiments, the insert is integral with the housing.

In accordance with an embodiment of the disclosure, the circumferential seal assembly includes a primary sealing ring, a second sealing ring, a third sealing ring, and an insert. The second sealing ring includes a ring portion interposed between a pair of cylindrical portions. The second sealing ring is radially interposed between a housing and a rotatable element. The primary sealing ring is radially interposed between one cylindrical portion and the rotatable element. The primary sealing ring at one end sealingly engages a face sealing surface along the housing. The primary sealing ring sealingly engages a radial sealing surface along an inner circumferential surface of the rotatable element. The ring portion sealingly engages a face surface at another end of the primary sealing ring. The third sealing ring sealingly engages the other cylindrical portion. The insert includes an outward flange extending from an annular ring portion. The outward flange is axially interposed between the ring portion and the third sealing ring. The third sealing ring is radially interposed between the annular ring portion and other cylindrical portion. The third sealing ring sealingly engages a flange face of the inward flange. The insert and the third sealing ring define a first cavity. The primary sealing ring, the second sealing ring, the insert, and the housing define a second cavity. The insert and the second sealing ring cooperate to separate the first cavity and the second cavity.

In accordance with other embodiments, the rotatable element is a shaft.

In accordance with other embodiments, the rotatable element is a runner disposed along a shaft.

In accordance with other embodiments, in use, the first cavity is suitable to be at a higher pressure and the second cavity is suitable to be at a lower pressure.

In accordance with other embodiments, the primary sealing ring includes a seal bore dam which sealingly engages the radial sealing surface adjacent to the second sealing ring.

In accordance with other embodiments, the housing includes at least one exhaust port which permits a fluid, in use, to exit the second cavity.

In accordance with other embodiments, the primary sealing ring comprises a carbon.

In accordance with other embodiments, the second sealing ring comprises a metal.

In accordance with other embodiments, the third sealing ring comprises one of a metal or a carbon.

In accordance with other embodiments, the second sealing ring is axially biased in direction of the primary sealing ring via at least one spring.

In accordance with other embodiments, the primary sealing ring is axially biased toward the face sealing surface via the second sealing ring.

In accordance with other embodiments, the insert is integral with the housing.

In accordance with other embodiments, the primary sealing ring is biased in direction of the radial sealing surface via at least one spring radially interposed between the one cylindrical portion and the primary sealing ring.

In accordance with other embodiments, a plurality of retaining pins extend at one end into the primary sealing ring and at another end into the second sealing ring.

In accordance with other embodiments, the spring(s) permits proper alignment of the seal segments of the primary sealing ring to accept the retaining pins.

In accordance with other embodiments, a plurality of anti-rotation pins extend at one end into the primary sealing ring and at another end into the housing.

In accordance with an embodiment of the disclosure, the circumferential seal assembly includes a primary sealing ring, a second sealing ring, a third sealing ring, and an insert. The primary sealing ring is radially interposed between a housing and a rotatable element. The primary sealing ring at a first end sealingly engages a face sealing surface along the housing. The primary sealing ring sealingly engages a radial sealing surface along an outer circumferential surface of the rotatable element. The second sealing ring is radially interposed between the housing and the rotatable element. The second sealing ring comprises a ring portion. The ring portion sealingly engages a face surface at a second end of the primary sealing ring. The third sealing ring is radially interposed between the housing and the rotatable element. The third sealing ring sealingly engages the second sealing ring opposite the primary sealing ring. The second sealing ring is axially interposed between the primary sealing ring and the third sealing ring. The insert is radially interposed between and contacting the second sealing ring and the housing. The primary sealing ring, the second sealing ring, and the third sealing ring in cooperation with the rotatable element define a first cavity. The primary sealing ring, the second sealing ring, and the third sealing ring in cooperation with the housing define a second cavity. The primary sealing ring, the second sealing ring, and the third sealing ring cooperate to separate the first cavity and the second cavity.

In accordance with other embodiments, the rotatable element is a shaft.

In accordance with other embodiments, the rotatable element is a runner.

In accordance with other embodiments, in use, the first cavity is suitable to be at a higher pressure and the second cavity is suitable to be at a lower pressure.

In accordance with other embodiments, the primary sealing ring includes a seal bore dam which sealingly engages the radial sealing surface adjacent to the second sealing ring.

In accordance with other embodiments, the housing includes at least one exhaust port which permits a fluid, in use, to exit the second cavity.

In accordance with other embodiments, the primary sealing ring comprises a carbon.

In accordance with other embodiments, the second sealing ring comprises a metal.

In accordance with other embodiments, the third sealing ring is a bellows seal.

In accordance with other embodiments, the second sealing ring is axially biased in direction of the primary sealing ring via the third sealing ring.

In accordance with other embodiments, the primary sealing ring is axially biased toward the face sealing surface via the second sealing ring.

In accordance with other embodiments, the third sealing ring is secured at one end to an aft extension of the second sealing ring and at other end to a forward extension of a back plate.

In accordance with other embodiments, the back plate is secured to the housing.

In accordance with other embodiments, the insert comprises a first portion with a second portion extending therefrom and the second portion is elastically responsive.

In accordance with other embodiments, the first portion is an annular element.

In accordance with other embodiments, the second portion comprises a plurality of finger springs.

In accordance with other embodiments, the insert separates a first part of the second cavity adjacent to the primary sealing ring and a second part of the second cavity adjacent to the third sealing ring wherein the second portion is adjacent to the second part of the second cavity.

In accordance with other embodiments, the insert is integral with the housing.

One or more advantages are possible. The disclosure facilitates circumferential sealing which minimizes wear along a face sealing surface, between a primary sealing ring and a housing, and along a radial sealing surface, between a primary sealing ring and a rotating shaft or runner. The disclosure facilitates circumferential sealing which minimizes heating along a radial sealing surface between a primary sealing ring and a rotating shaft or runner. The disclosure minimizes contact forces thereby reducing oil coolant requirements along a radial sealing surface between a primary sealing ring and a rotating shaft or runner. The disclosure reduces contact forces thereby reducing or eliminating coolant needs along a radial sealing surface between a primary sealing ring comprising ceramic and a rotating shaft or runner. Hydrostatic embodiments provide a self-adjusting force balance at the radial sealing surface and/or the face sealing surface. Hydrodynamic embodiments may provide a self-adjusting force balance at the radial sealing surface and/or the face sealing surface.

The above and other objectives, features, and advantages of the preferred embodiments of the disclosure will become apparent from the following description read in connection with the accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in the light of the following description made in conjunction with the accompanying drawings.

FIG. 20a is an enlarged cross-section view illustrating an insert (lower cross-section not shown) including a first portion and a second portion in accordance with an embodiment of the disclosure.

FIG. 20b is an enlarged partial side view illustrating the insert of FIG. 20a wherein the first portion is an annular element and the second portion is a plurality of finger springs in accordance with an embodiment of the disclosure.

FIG. 20c is an enlarged cross-section view illustrating a finger spring of FIG. 20b in accordance with an embodiment of the disclosure.

DETAILED DESCRIPTION

Figure 1:
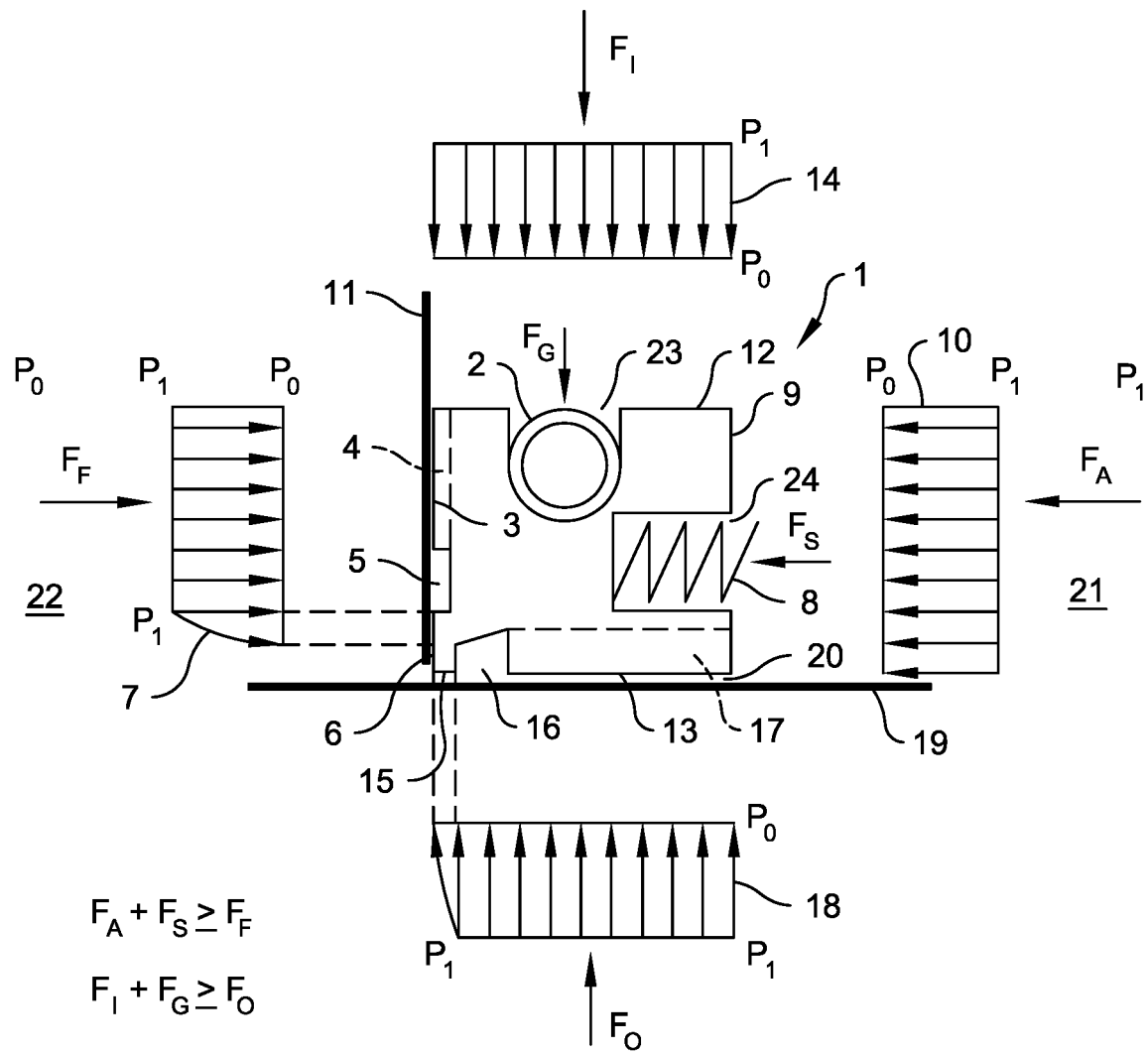
FIG. 1 is an enlarged cross-section view illustrating a circumferential seal from the prior art with exemplary pressure profiles and resultant forces thereon (housing components disposed about the seal not shown).

Reference will now be made in detail to several embodiments of the disclosure that are illustrated in the accompanying drawings. Wherever possible, same or similar reference numerals are used in the drawings and the description to refer to the same or like parts. The drawings are in simplified form and are not to precise scale.

While features of various embodiments are separately described, it is understood that such features are combinable to form other embodiments.

Figure 2:
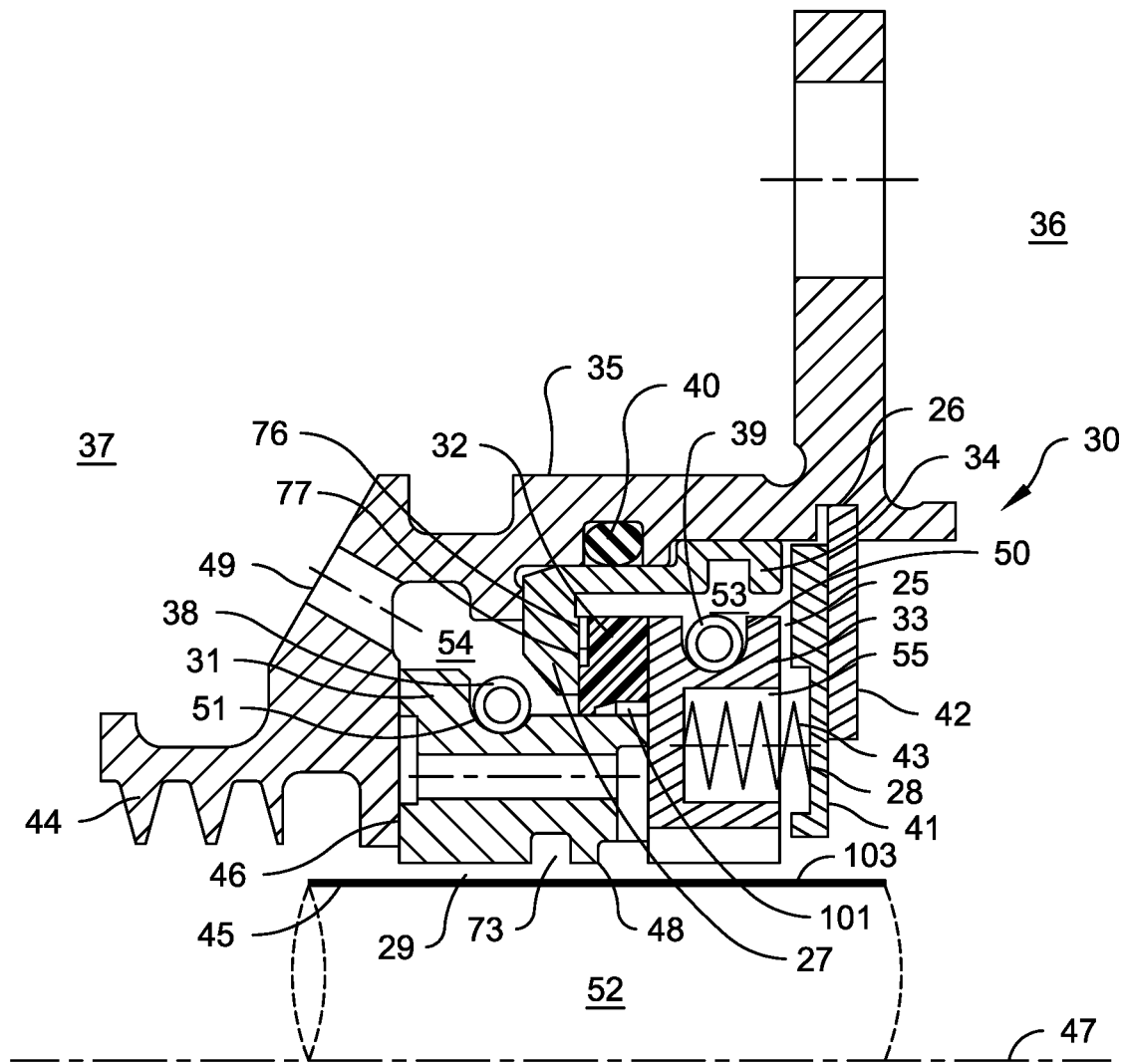
FIG. 2 is an enlarged cross-section view illustrating an improved circumferential seal assembly including a primary sealing ring, a second sealing ring, a third sealing ring, and an insert disposed within a housing whereby the primary sealing ring, the second sealing ring, the insert and the housing are arranged to define a cavity disposed directly about the primary sealing ring and the second sealing ring, the third sealing ring and the insert are arranged to define another cavity disposed directly about the second sealing ring and the third sealing ring in accordance with an embodiment of the disclosure.

Referring now to FIG. 2, a circumferential seal assembly 30 is shown disposed within a housing 35 about a rotatable element 52. The circumferential seal assembly 30 generally comprises a primary sealing ring 31, a second sealing ring 32, a third sealing ring 33, and an insert 34. Components for the circumferential seal assembly 30 are secured within the housing 35 preferably via securing means understood in the art, non-limiting examples including a back plate 41 and a retaining ring 42. Components of the circumferential seal assembly 30 are composed of materials suitable for the intended applications, examples including but not limited to metals, ceramics, and non-metals, one further non-limiting example of the latter being carbon.

Referring again to FIG. 2, the circumferential seal assembly 30, housing 35, and rotatable element 52 are aligned along and disposed about a rotational axis 47, often coinciding with the rotational axis within a turbine engine. The rotatable element 52 is broadly defined to include a rotatable shaft or the like with or without elements extending therefrom, one non-limiting example of the latter being a runner.

Referring again to FIG. 2, the circumferential seal assembly 30, housing 35, and rotatable element 52 generally cooperate to define and separate a higher pressure side 36 and a lower pressure side 37. The housing 35 is attached to structural components (not shown) of a turbine engine via methods understood in the art so as to secure the circumferential seal assembly 30 therein. In this arrangement, the circumferential seal assembly 30 and housing 35 are non-rotating. The configuration of the housing 35 is design dependent; however, it is understood for purposes of the present disclosure that the housing 35 cooperates with the circumferential seal assembly 30 and the rotatable element 52 to define two separate compartments whereby one fluid, such as a lubricant, resides at a lower pressure within a compartment coinciding with the lower pressure side 37 and another fluid, such as a gas, resides at a higher pressure within a compartment coinciding with the higher pressure side 36.

Referring again to FIG. 2, the primary sealing ring 31 is disposed within the housing 35 so as to sealingly engage the rotatable element 52 along an outer surface thereof over a region referred to as the radial sealing surface 45. While the radial sealing surface 45 is shown along the outer circumferential surface 103 of the rotatable element 52, it is understood that the radial sealing surface 45 may be disposed along the inner diameter of a rotatable element 52 in other embodiments of the disclosure. The primary sealing ring 31 also sealingly engages an inside surface along the housing 35 over a region referred to as a face sealing surface 46 adjacent to the lower pressure side 37. It is further understood that the face sealing surface 46 may be adjacent to an optional windback 44 which extends from the housing 35 into the lower pressure side 37. Sealing engagement is generally understood to mean a non-contact arrangement and/or a contact arrangement that limits, prevents, or controls the flow of fluids between the higher pressure side 36 and the lower pressure side 37. In preferred embodiments, sealing engagement may be implemented via a thin-film fluid layer. In one specific example, the thin-film layer may be disposed along a gap 29 between the primary sealing ring 31 and the rotatable element 52.

Referring again to FIG. 2, the primary sealing ring 31 has an outer surface and an inner surface. The outer circumferential surface of the primary sealing ring 31 includes a spring groove 51. The spring groove 51 accepts a garter spring 38 which urges or biases the primary sealing ring 31 in the direction of the radial sealing surface 45. The inner circumferential surface of the primary sealing ring 31 includes a seal bore dam 48 and an annular groove 73. In preferred embodiments, the seal bore dam 48 is biased toward the third sealing ring 33 and away from the housing 35.

Referring again to FIG. 2, the insert 34 directly contacts a portion of the inner surface of the housing 35. The insert 34 is a ring-shaped element configured to contact and thereby to be securable within the housing 35. A portion of the insert 34 forms an inward flange 27 configured to extend toward but not contact the primary sealing ring 31. An O-ring 40 is positioned between the housing 35 and the insert 34 so as to prevent fluid from completely traversing the interface therebetween.

Referring again to FIG. 2, the second sealing ring 32 is positioned about the primary sealing ring 31 and adjacent to the inward flange 27. The second sealing ring 32 sealingly engages a portion of the outer circumferential surface of the primary sealing ring 31. The second sealing ring 32 also sealingly engages a portion of a face of the inward flange 27. The second sealing ring 32 extends below the end of the inward flange 27 so as to contact the outer circumferential surface of the primary sealing ring 31.

Referring again to FIG. 2, the third sealing ring 33 is positioned so as to overlay one side of the primary sealing ring 31 and the second sealing ring 32. The third sealing ring 33 is biased toward the primary sealing ring 31 via a plurality of compression springs 43. Each compression spring 43 is secured at one end within a pocket 55 along the third sealing ring 33 and at another end within a pocket 28 along the back plate 41. In preferred embodiments, the compression spring 43 ensures contact between the primary sealing ring 31 and the third sealing ring 33 and biases the primary sealing ring 31 toward the face sealing surface 46. This arrangement may or may not permit contact between the third sealing ring 33 and the second sealing ring 32. The outer circumferential surface of the third sealing ring 33 further includes a spring groove 50. The spring groove 50 accepts a garter spring 39 which urges or biases the third sealing ring 33 in the direction of the radial sealing surface 45.

Referring again to FIG. 2, the housing 35 includes a groove 26 which accepts the retaining ring 42. The back plate 41 is a ring-shaped element disposed between the retaining ring 42 and the third sealing ring 33. The compression spring 43 secures the back plate 41 to the retaining ring 42 by pushing the back plate 41 into contact with the retaining ring 42. In this arrangement, the compression spring 43 should remain sufficiently compressible so that the third sealing ring 33 and the primary sealing ring 31 are movable toward the back plate 41 in response to pressure forces at the face sealing surface 46. A gap 25 is provided between the back plate 41 and the third sealing ring 33 to accommodate axial displacements of the primary sealing ring 31 and the third sealing ring 33 thereby permitting further compression of the compression spring 43.

Referring again to FIG. 2, the insert 34, the second sealing ring 32, and the third sealing ring 33 are configured to cooperate to surround a region referred to as a first cavity 53. The first cavity 53 is communicable with the higher pressure side 36 via the gap 25. The gap 25 permits exchange of fluid between the first cavity 53 and the higher pressure side 36.

Referring again to FIG. 2, the primary sealing ring 31, the second sealing ring 32, the insert 34, and the housing 35 are configured to cooperate to enclose a region referred to as a second cavity 54. The second cavity 54 is communicable with the lower pressure side 37 via at least one exhaust port 49 along the housing 35. The exhaust port 49 is a hole disposed through the housing 35 which permits exchange of fluid between the second cavity 54 and the lower pressure side 37.

Referring again to FIG. 2, the second sealing ring 32 and the insert 34 are disposed between the first cavity 53 and the second cavity 54. This arrangement ensures separation between the first cavity 53 and the second cavity 54 thereby preventing fluids originating in the higher pressure side 36 from bypassing and negating the sealing function of the circumferential seal assembly 30. However, it is understood that fluid may slowly bleed across the interface formed between the second sealing ring 32 and each of the primary sealing ring 31, the third sealing ring 33, and the insert 34.

Figure 3A:
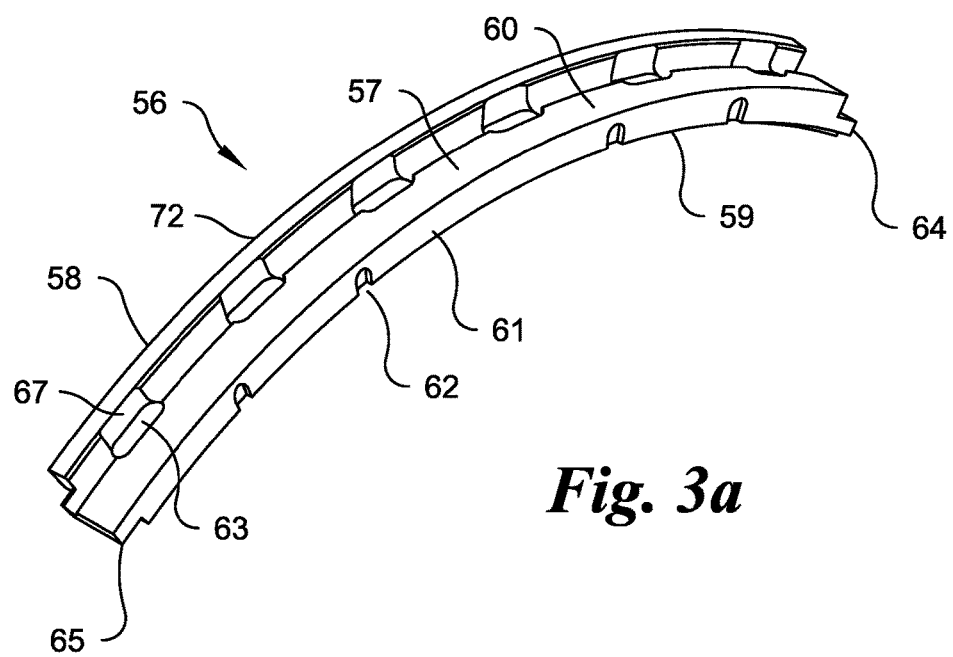
FIG. 3a is a perspective view illustrating a seal segment comprising a primary sealing ring whereby the seal segment includes a vertical feed groove and an optional vent channel with outlet end adjacent to a vertical groove in accordance with an embodiment of the disclosure.

Referring now to FIG. 3a, the primary sealing ring 31 in FIG. 2 is comprised of two or more seal segments 56 which in combination form a ring-shaped structure referred to as a segmented ring. Each seal segment 56 includes a vertical flange 58 at one end of a horizontal flange 57. This arrangement defines a generally L-shaped cross section for the seal segment 56. The vertical flange 58 extends in an outward radial direction from the horizontal flange 57. The vertical flange 58 and the horizontal flange 57 are curved so as to form a ring-shaped vertical flange 58 and a ring-shaped horizontal flange 57 when two or more seal segments 56 are combined. A first end 64 and a second end 65 of the seal segment 56 may include features facilitating an interlocking engagement between adjoining seal segments 56. In some embodiments, the interlock may be implemented by a tongue and a groove arrangement such as in FIG. 3a; however, it is understood that other interlocking means are also applicable to the disclosure as generally illustrated by the first end 64 and the second end 65 in FIGS. 3b-3d.

Referring again to FIG. 3a, the seal segment 56 includes an inlet side 61 and an outlet side 72. The inlet side 61 is disposed along the horizontal flange 57 opposite of the vertical flange 58. The inlet side 61 is oriented toward the higher pressure side 36 in FIG. 2. An outlet side 72 is disposed along the vertical flange 58 opposite the horizontal flange 57. The outlet side 72 is oriented toward the lower pressure side 37 in FIG. 2. At least one vertical feed groove 62 extends across a portion of the inlet side 61 from the inner surface 59. At least one vent channel 63 extends into the seal segment 56 from the outer surface 60 adjacent to the intersection between the horizontal flange 57 and the vertical flange 58. A vertical groove 67 is positioned along the vertical flange 58 and is aligned with the vent channel 63.

Figure 3B:
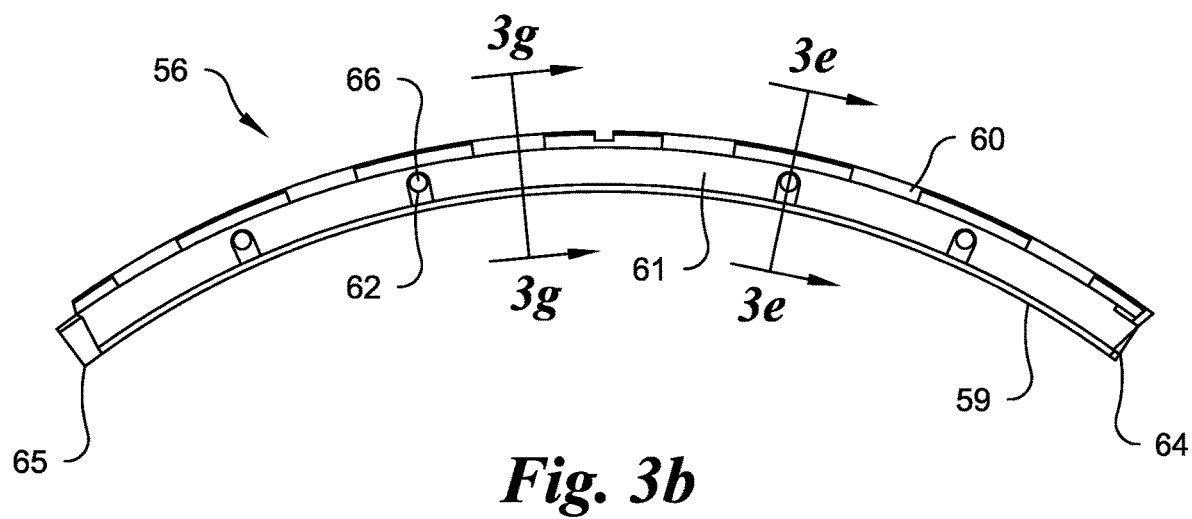
FIG. 3b is a side view illustrating an inlet side of the seal segment whereby the vertical feed groove is disposed about the inlet end of a first channel in accordance with an embodiment of the disclosure.
Figure 3C:
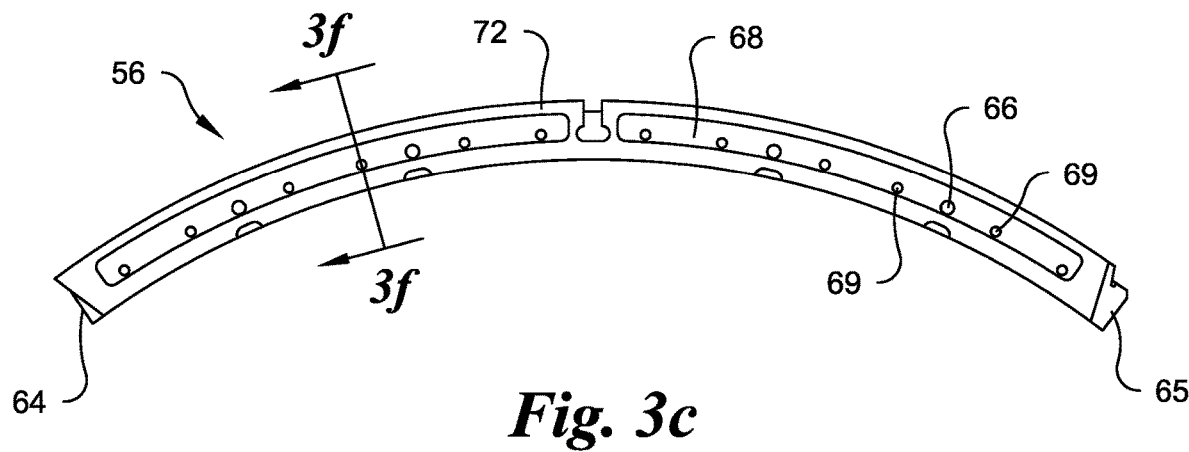
FIG. 3c is a side view illustrating an outlet side of the seal segment whereby an optional pocket is disposed about the outlet end of the first channel and the inlet end to an optional second channel in accordance with an embodiment of the disclosure.

Referring now to FIGS. 3b and 3c, the vertical feed groove 62 extends outward from the inner surface 59 in the direction of the outer surface 60. The vertical feed groove 62 intersects one end of a first channel 66 at the inlet side 61. Another end of the first channel 66 intersects the outlet side 72. In preferred embodiments, the outlet side 72 has a pocket 68 that intersects the first channel 66. At least one optional second channel 69 may extend into the seal segment 56 from the outlet side 72, preferably intersecting the pocket 68. The number, arrangement, and size of the first channel 66 and the second channel 69 are design dependent based on the flow requirements at the radial sealing surface 45 and the face sealing surface 46.

Figure 3D:
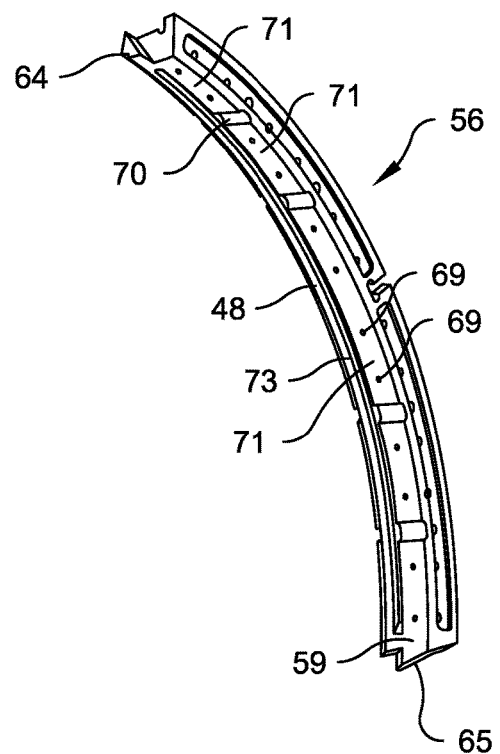
FIG. 3d is a perspective view illustrating the outlet end of the second channel, the inlet end of the optional vent channel, and optional bore and annular grooves and seal bore dam along the bore surface of the seal segment in accordance with an embodiment of the disclosure.

Referring now to FIG. 3d, the inner surface 59 of the seal segment 56 may include features which facilitate sealing along the radial sealing surface 45. For example, the outlet of the second channel 69 may intersect the inner surface 59, preferably at a pad 71. In another example, a bore groove 70 may be interposed between adjoining pads 71. The bore groove 70 may also intersect the annular groove 73, the latter interposed between the pads 71 and the seal bore dam 48. The arrangement between bore grooves 70 and annular groove 73 permits fluid from the lower pressure side 37 to pass under the seal segment 56.

Figure 3E:
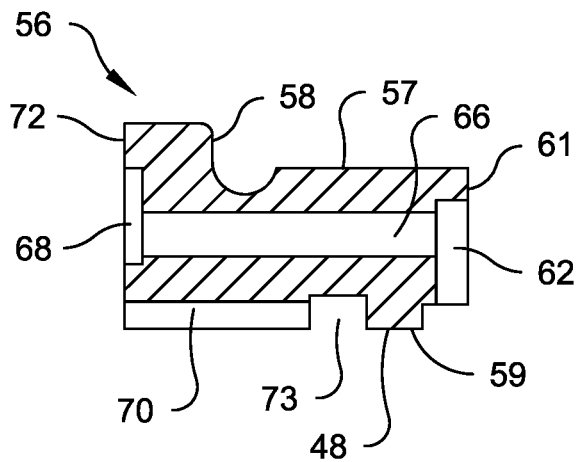
FIG. 3e is an enlarged cross-cross section view illustrating the pathway permitting fluid to flow from the inlet side to the outlet side of the seal segment whereby the pathway is formed by the vertical feed groove, the first channel, and the pocket in accordance with an embodiment of the disclosure.

Referring now to FIG. 3e, vertical feed groove 62, first channel 66, and pocket 68 are contiguous so as to form a pathway across the seal segment 56 between the inlet side 61 and the outlet side 72. The seal bore dam 48 is interposed between the vertical feed groove 62 and the annular groove 73. The bore groove 70 and the annular groove 73 are contiguous so as to form a pathway along the inner surface 59 across the vertical flange 58 and a portion of the horizontal flange 57.

Figure 3F:
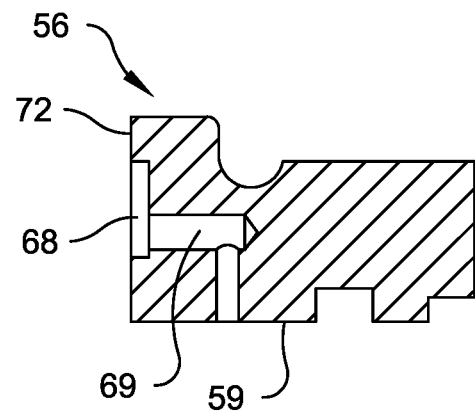
FIG. 3f is an enlarged cross-section view illustrating the pathway permitting fluid to flow from the outlet side to the inner surface of the seal segment whereby the pathway is formed by the pocket and the second channel in accordance with an embodiment of the disclosure.

Referring now to FIG. 3f, pocket 68 and second channel 69 are contiguous so as to form a pathway across the seal segment 56 between the outlet side 72 and the inner surface 59. Although the second channel 69 is shown composed of intersecting linear segments, it is understood that the second channel 69 may consist of one or more linear or nonlinear cavities that permit flow of a fluid from the outlet side 72 to the inner surface 59. While the first channel 66 and the second channel 69 may communicate with the same pocket 68, each of the first channel 66 and the second channel 69 is separately disposed within the seal segment 56. Therefore, it is understood that the arrangement of the first channel 66 in FIG. 3e and the second channel 69 in FIG. 3f permits a fluid to pass through the first channel 66 before exiting into the pocket 68 where the fluid is then redirected into and through the second channel 69.

Figure 3G:
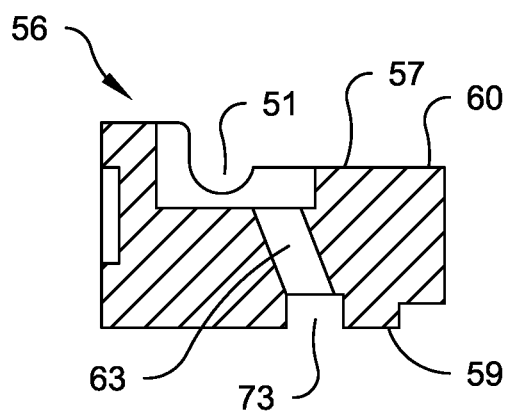
FIG. 3g is an enlarged cross-section view illustrating the pathway permitting fluid to flow from the inner surface to the outer surface of the seal segment whereby the pathway is formed by the vent channel in accordance with an embodiment of the disclosure.

Referring now to FIG. 3g, a vent channel 63 forms a pathway across the horizontal flange 57 of the seal segment 56 from the inner surface 59 to the outer surface 60. In preferred embodiments, one end of the vent channel 63 may intersect the annular groove 73 and the other end may intersect the outer surface 60 adjacent to the spring groove 51. The vent channel 63 facilitates venting of fluid otherwise communicated onto the radial sealing surface 45. For example, the vent channel 63 permits fluid communicated onto the inner surface 59 via the second channel 69 or via the bore groove 70 into the annular groove 73 to traverse the seal segment 56 before entering the second cavity 54.

Figure 4A:
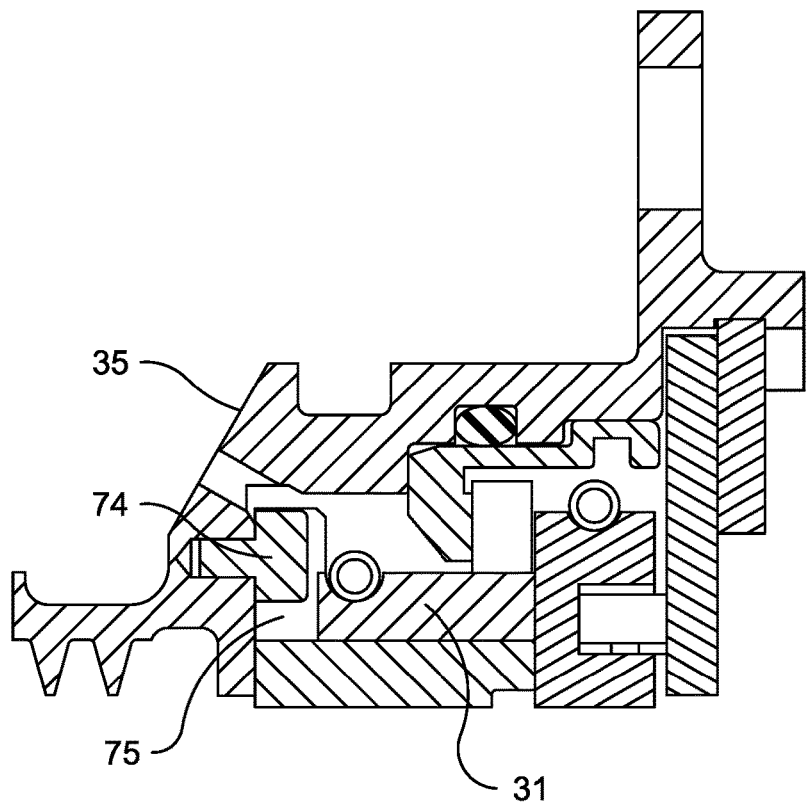
FIG. 4a is an enlarged cross-section view illustrating an anti-rotation pin extending into a pocket along the primary sealing ring in accordance with an embodiment of the disclosure.
Figure 4B:
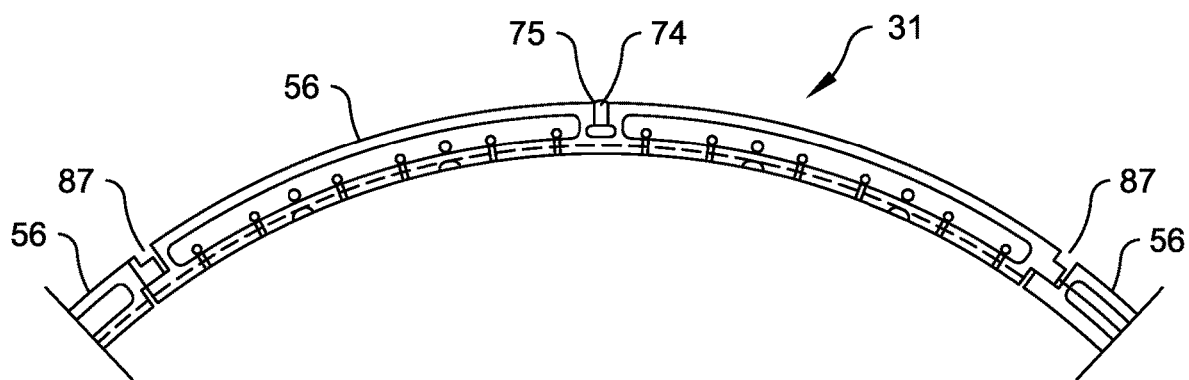
FIG. 4b is a side view illustrating several seal segments of the primary sealing ring with the anti-rotation pin extending into a pocket along one seal segment in accordance with an embodiment of the disclosure.

Referring now to FIGS. 4a and 4b, at least one anti-rotation pin 74 may be disposed within the housing 35. The anti-rotation pin 74 is secured to the housing 35 via threaded or press fit engagement and positioned so as to extend into the housing 35 adjacent to the primary sealing ring 31. The anti-rotation pin 74 extends into a pocket 75 disposed along a seal segment 56. The anti-rotation pin 74 mechanically engages the seal segment 56 at the pocket 75 so as to prevent relative rotational motion between the primary sealing ring 31 and the housing 35. The pocket 75 may be positioned along the seal segment 56 as shown in FIG. 4b or positioned at or adjacent to a joint 87 between adjoining seal segments 56.

Figure 5:
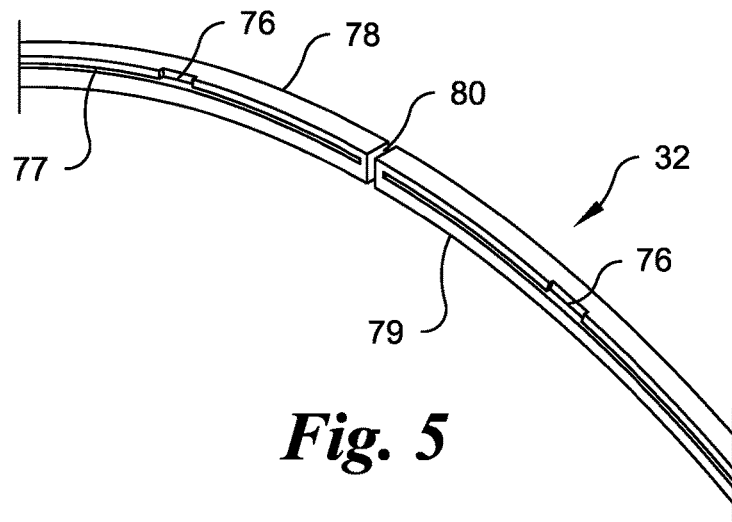
FIG. 5 is a perspective view illustrating a joint and optional face and feed grooves along the second sealing ring in accordance with an embodiment of the disclosure.

Referring now to FIG. 5, the second sealing ring 32 is preferred to be a contiguous ring-shaped element with a single gap 80. The contiguousness of the second sealing ring 32 restricts fluid from passing between joints along the otherwise segmented third sealing ring 33. The gap 80 facilitates expansion of the second sealing ring 32 during assembly onto and disassembly from other components comprising the circumferential seal assembly 30. The higher pressure side 78 of the second sealing 32 may contact or nearly contact the third sealing ring 33, the latter illustrated by the gap 88 in FIG. 9. The gap 88 may be sized to the maximum wear along the primary sealing ring 31 at the face sealing surface 46 over the anticipated lifetime of the primary sealing ring 31. In some embodiments, the second sealing ring 32 may sealingly engage the third sealing ring 33.

Referring again to FIG. 5, it may be advantageous in some embodiments for the second sealing ring 32 to further include a face groove 77 communicable with one or more feed grooves 76 at the lower pressure side 79. The face groove 77 and the feed groove 76 may be positioned along the interface between the insert 34 and the second sealing ring 32, as shown in FIG. 2. This arrangement permits fluid within the first cavity 53 to flow in the face groove 77 via the feed groove(s) 76 so as to enhance sealing engagement between the insert 34 and the second sealing ring 32. It may also be advantageous to provide one or more pockets 101 along the inner circumferential surface of the second sealing ring 32, as generally represented in FIG. 2, to enhance sealing at the interface with the primary sealing ring 31.

Figure 6A:
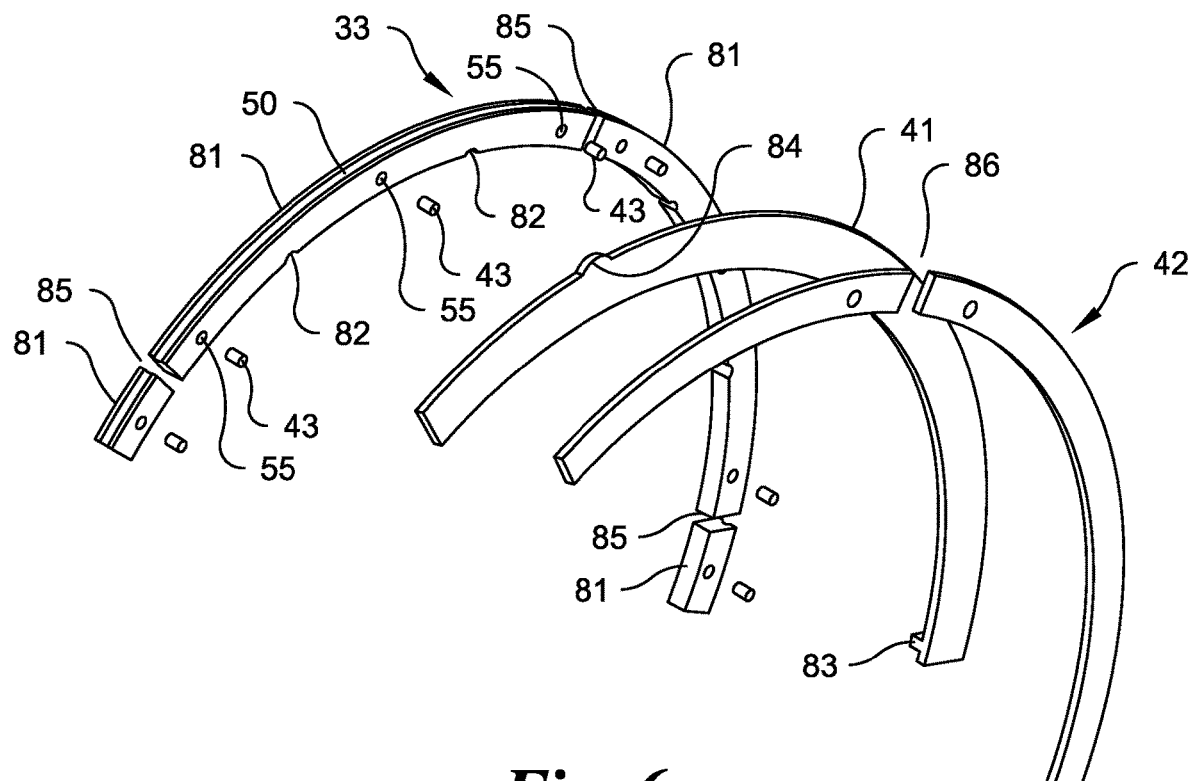
FIG. 6a is an exploded view illustrating a portion of each of the third sealing ring, a back ring, and a retaining ring in accordance with an embodiment of the disclosure.

Referring now to FIG. 6a, the third sealing ring 33 comprises at least two ring segments 81 disposed in an end-to-end arrangement forming a ring-shaped structure. The ends of adjoining ring segments 81 may include interlockable features, such as described in FIGS. 3a and 3b, at each joint 85. In preferred embodiments, the joints 85 along the third sealing ring 33 are offset from the joints 87 along the primary sealing ring 31 to minimize leakage across the circumferential seal assembly 30.

Referring again to FIG. 6a, each ring segment 81 may include one or more pockets 55 along a face adjacent to the back plate 41. The pocket 55 accepts the compression spring 43 so that a portion of the compression spring 43 partially extends from the pocket 55. Each compression spring 43 biases the third sealing ring 33 onto the primary sealing ring 31 and biases the back plate 41 onto the retaining ring 42 as described in FIG. 2.

Referring now to FIGS. 6a and 2, each ring segment 81 has one or more bore grooves 82. The bore groove 82 traverses the ring segment 81 at the inner radial surface thereof. The bore groove 82 permits fluid originating in the higher pressure side 36 to traverse the ring segment 81 before entering the primary sealing ring 31. Fluid within the bore groove 82 may oppose the inward force applied by the garter spring 39 along the spring groove 50 thereby reducing the resultant load force between the third sealing ring 33 and the radial sealing surface 45 or separating the third sealing ring 33 from the radial sealing surface 45.

Referring again to FIGS. 6a and 2, the back plate 41 is a ring-shaped element disposed between the third sealing ring 33 and the retaining ring 42. The back plate 41 is arranged to permit indirect contact with the third sealing ring 33 via the compression springs 43 and direct contact with the retaining ring 42. However, it is understood in some embodiments that the third sealing ring 33 may translate within the circumferential seal assembly 30 so as to compress the compression springs 43 with or without contacting the back plate 41.

Figure 6B:
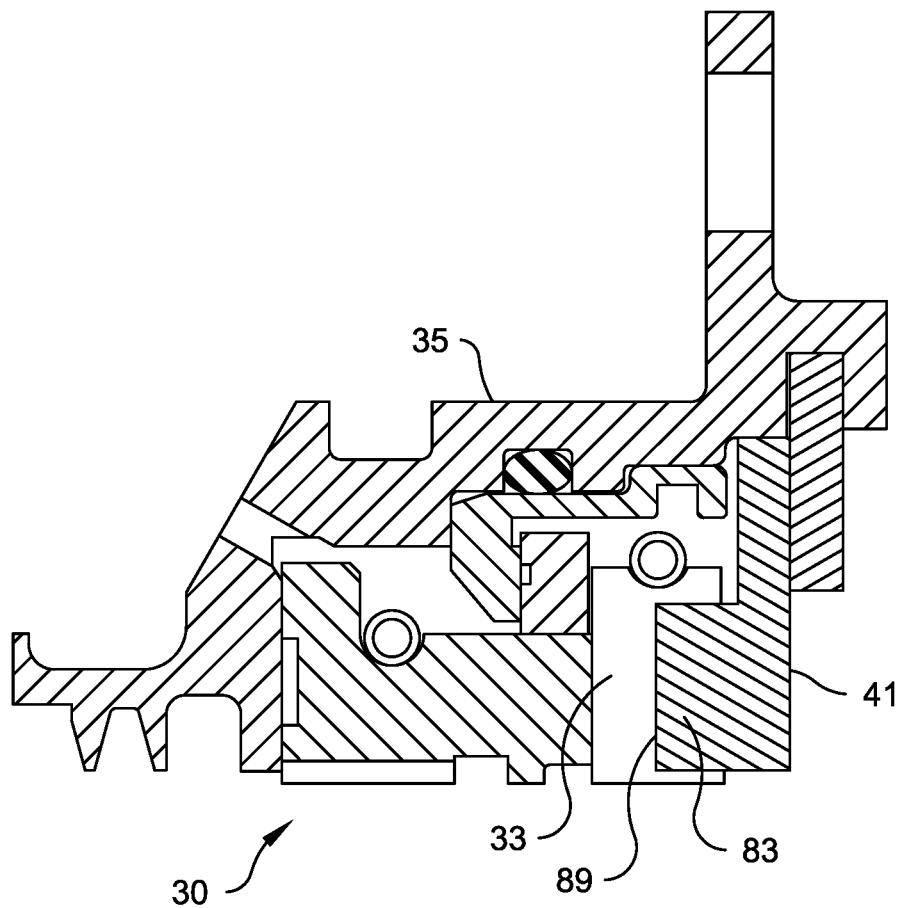
FIG. 6b is an enlarged cross-section view illustrating engagement between the anti-rotation tab along the back plate and a slot along the third sealing ring at the gap between ring segments in accordance with an embodiment of the disclosure.

Referring now to FIGS. 6a, 6b and 2, the back plate 41 is preferred to not rotate with respect to the circumferential seal assembly 30 and the housing 35. The back plate 41 may include an anti-rotation tab 84 which extends radially outward therefrom. The anti-rotation tab 84 engages a complementary slot (not shown) along the housing 35 so as to prevent relative rotation between the back plate 41 and the circumferential seal assembly 30. The back plate 41 may also include an anti-rotation tab 83 which extends axially from a face adjacent to the third sealing ring 33. The anti-rotation tab 83 may engage a slot 89 or the like at a gap between two adjoining ring segments 81 along the third sealing ring 33 to prevent relative rotation between the third sealing ring 33 and the back plate 41.

Referring again to FIGS. 6a and 2, the retaining ring 42 is a ring-shaped element with an end gap 86. The retaining ring 42 should be sufficiently flexible so that the opening at the end gap 86 may be closed thereby reducing the outer diameter of the retaining ring 42 for assembly onto the groove 26. The retaining ring 42 should also be sufficiently resilient permitting the end gap 86 to return its original shape when compressive forces are removed so that the retaining ring 42 properly seats onto the groove 26.

Figure 7:
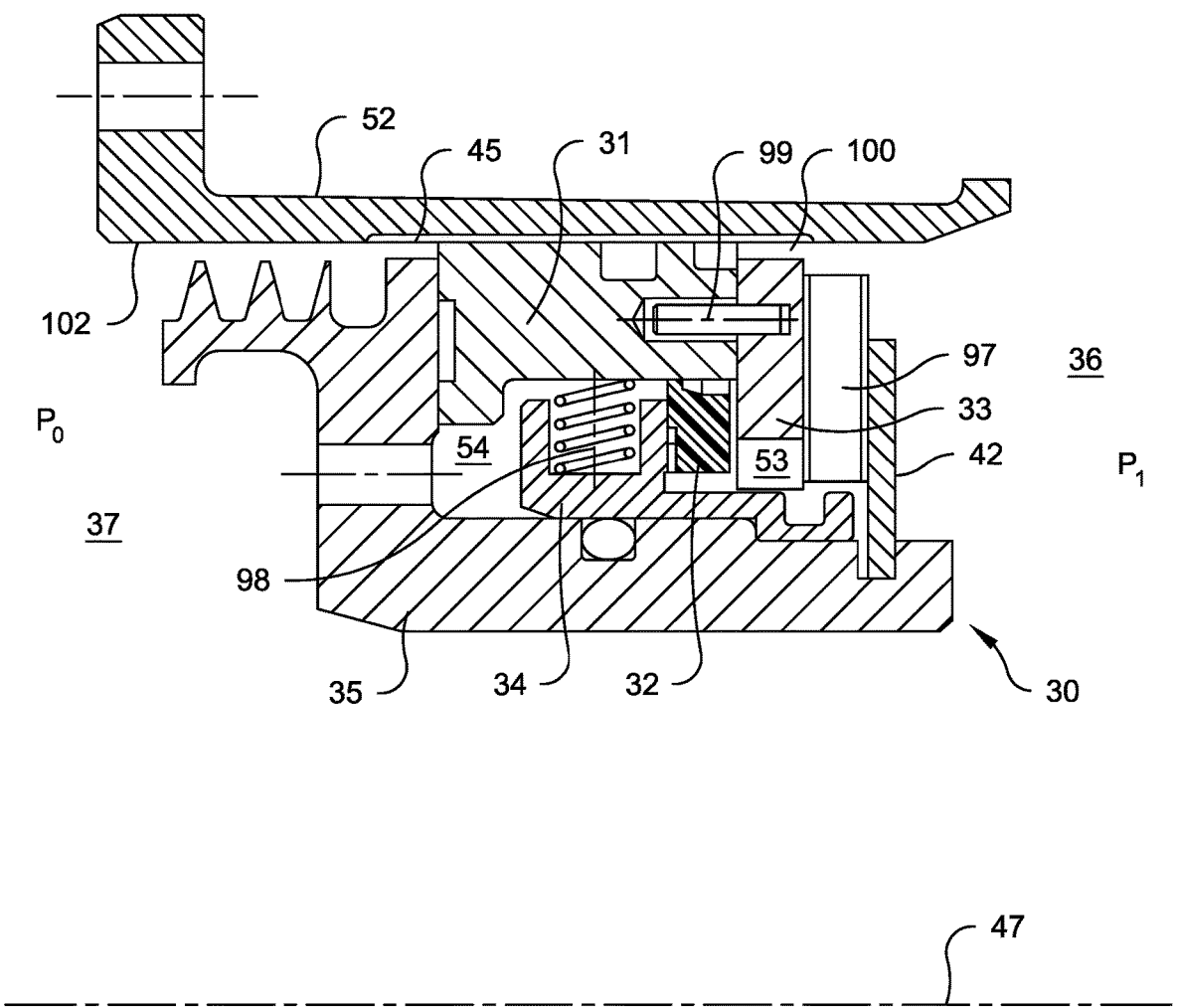
FIG. 7 is an enlarged cross-section view illustrating an improved circumferential seal assembly configured to sealingly engage an inner circumferential surface of a rotatable element whereby a plurality of springs directly contact both a primary sealing ring within the rotatable element and an insert secured to a housing about the sealing assembly so that the springs bias the primary sealing ring in the direction of the inner circumferential surface in accordance with an embodiment of the disclosure.

Referring now to FIG. 7, the circumferential seal assembly 30 is shown disposed within a rotatable element 52 rotatable about a rotational axis 47. In this embodiment, the rotatable element 52 is disposed about the circumferential seal assembly 30 so that at least the primary sealing ring 31 sealingly engages the inner circumferential surface 102 of the rotatable element 52 along a region referred to as the radial sealing surface 45 between a higher pressure side 36 and a lower pressure side 37.

Referring again to FIG. 7, one or more compression springs 98 may be disposed between each seal segment of the primary sealing ring 31 and the insert 34. One end of a compression spring 98 may be recessed within the insert 34 so that a second end of the compression spring 98 extends therefrom. The second end contacts the primary sealing ring 31 thereby communicating a biasing force onto each segment in the direction of the rotatable element 52. In this embodiment, the compression springs 98 push the segments comprising the primary sealing ring 31 outward so that the primary sealing ring 31 favors expansion rather than contraction. The primary sealing ring 31, the second sealing ring 32, the third sealing ring 33, and the insert 34 cooperate to define the first cavity 53 and the second cavity 54, as otherwise described herein.

Referring again to FIG. 7, the third sealing ring 33 in some embodiments may facilitate elimination of the back plate 41. The third sealing ring 33 may be a ring-shaped, metal element with an inward face that sealingly engages the primary sealing ring 31 and the second sealing ring 32. A spring 97 may contact the outward face of the third sealing ring 33. By way of example, the spring 97 may be a wave spring which contacts at one end the third sealing ring 33 and at another end the retaining ring 42. The retaining ring 42 is secured to the housing 35 as described herein thereby allowing the spring 97 to push or bias the third sealing ring 33 into engagement with the primary sealing ring 31.

Referring again to FIG. 7, optional retaining pins 99 may extend at one end into the primary sealing ring 31 and at another end into the third sealing ring 33 about the interface therebetween. During assembly, the compression springs 98 are seated onto the insert 34 and segments comprising the primary sealing ring 31 are placed about the compression springs 98. A compressive force is applied onto the compression springs 98 via the sealing segments so as to properly align the segments with the retaining pins 99. The retaining pins 99 engage cavities along the sealing segments so as to allow the retaining pins 99 to hold the segments in place. Optional anti-rotation paddle pins (not shown) could be pressed into the seal housing 35 adjacent to the sealing face and aligned to engage the primary sealing ring 31. Both retaining pins 99 and anti-rotation pins should permit the primary sealing ring 35 to expand and contract as required to ensure proper sealing along the radial sealing surface 45.

Referring again to FIG. 7, the third sealing ring 33 is disposed about the rotatable element 52 with an annular gap 100 therebetween. This arrangement is advantageous in that it avoids heating and wear along the outer surface of the third sealing ring 33 and along the inner circumferential surface 102. However, it is understood that an annular gap 100 may not be required in this and other embodiments of the disclosure thereby permitting the third sealing ring 33 to contact the rotatable element 52. By way of examples, a primary sealing ring 31 with tongue/socket joints may be used with a third sealing ring 33 with or without an annular gap 100, whereas a primary sealing ring 31 with radially overlapping joints would permit too much fluid to traverse the circumferential seal assembly 30 thereby requiring contact between the third sealing ring 33 and a rotatable element 52 along the radial sealing surface 45. Contacting arrangements may permit the third sealing ring 33 to be composed of carbon or other material(s) suitable for contact sealing.

Figure 8:
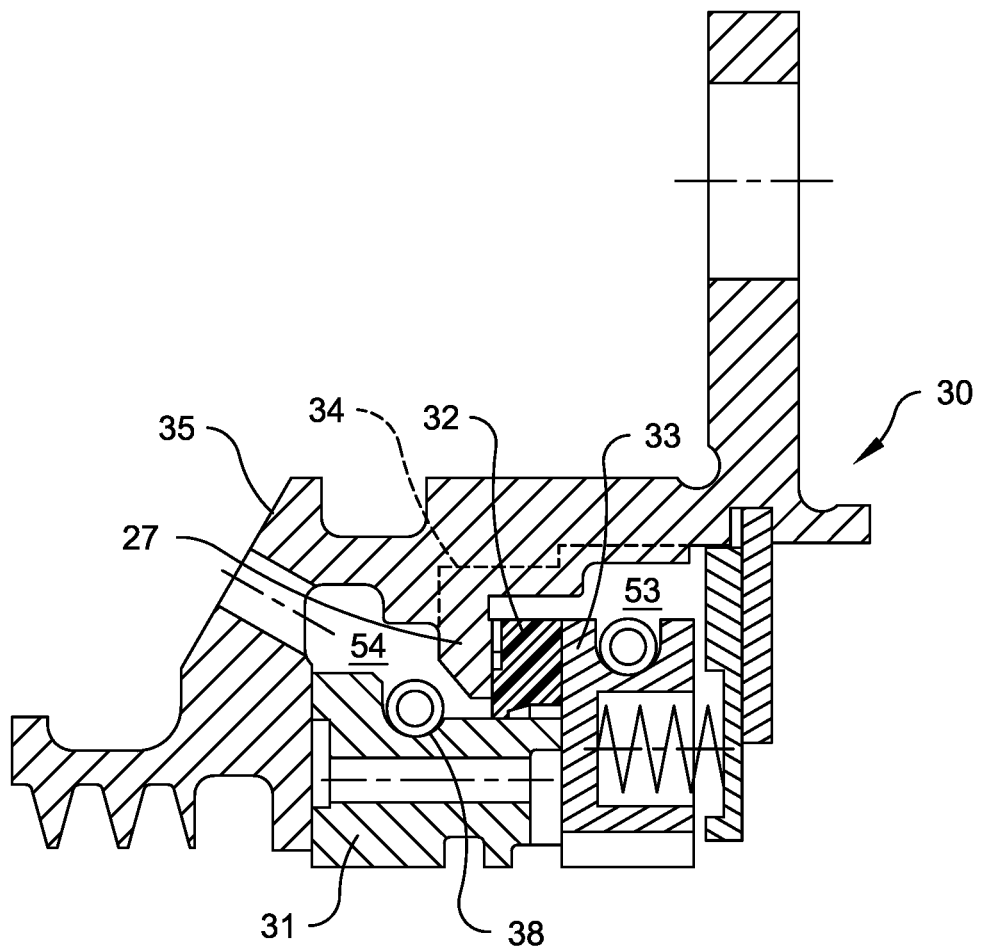
FIG. 8 is an enlarged cross-section view illustrating an insert geometry shown integral with the housing in accordance with an embodiment of the disclosure.

Referring now to FIG. 8, the insert 34 in some embodiments may be integral with the housing 35 rather than a separate component from the housing 35. In these embodiments, the insert 34 may be a part of the housing 35 or fixed to the housing 35 so as to be non-separable therefrom. In the former embodiments, the insert 34 may be directly formed onto the housing 35. In the latter embodiments, the insert 34 may be fabricated separate from the housing 35 and then secured thereto via a weld or other methods understood in the art. The inward flange 27 extends toward the primary sealing ring 31 and cooperates with the primary sealing ring 31, the second sealing ring 32, and the third sealing ring 33 to define the first cavity 53 and the second cavity 54, as otherwise described herein.

Referring again to FIG. 8, the insert 34 may complicate assembly of the circumferential seal assembly 30 when the inner diameter of the inward flange 27 is smaller than the outer diameter of the primary sealing ring 31. In these embodiments, the primary sealing ring 31 is assembled onto the housing 35 by inserting less than all segments of the primary sealing ring 31 into the housing 35. The garter spring 38 is placed about the portion of the primary sealing ring 31 residing within the housing 35. The remaining segment(s) of the primary sealing ring 31 is then inserted into housing 35 and the garter spring 38 is expanded so as to accept each segment now properly positioned to complete the primary sealing ring 31. Thereafter, the garter spring 38 is released so as to contract onto all seal segments thereby maintaining the ring shape of the primary sealing ring 31.

Figure 9:
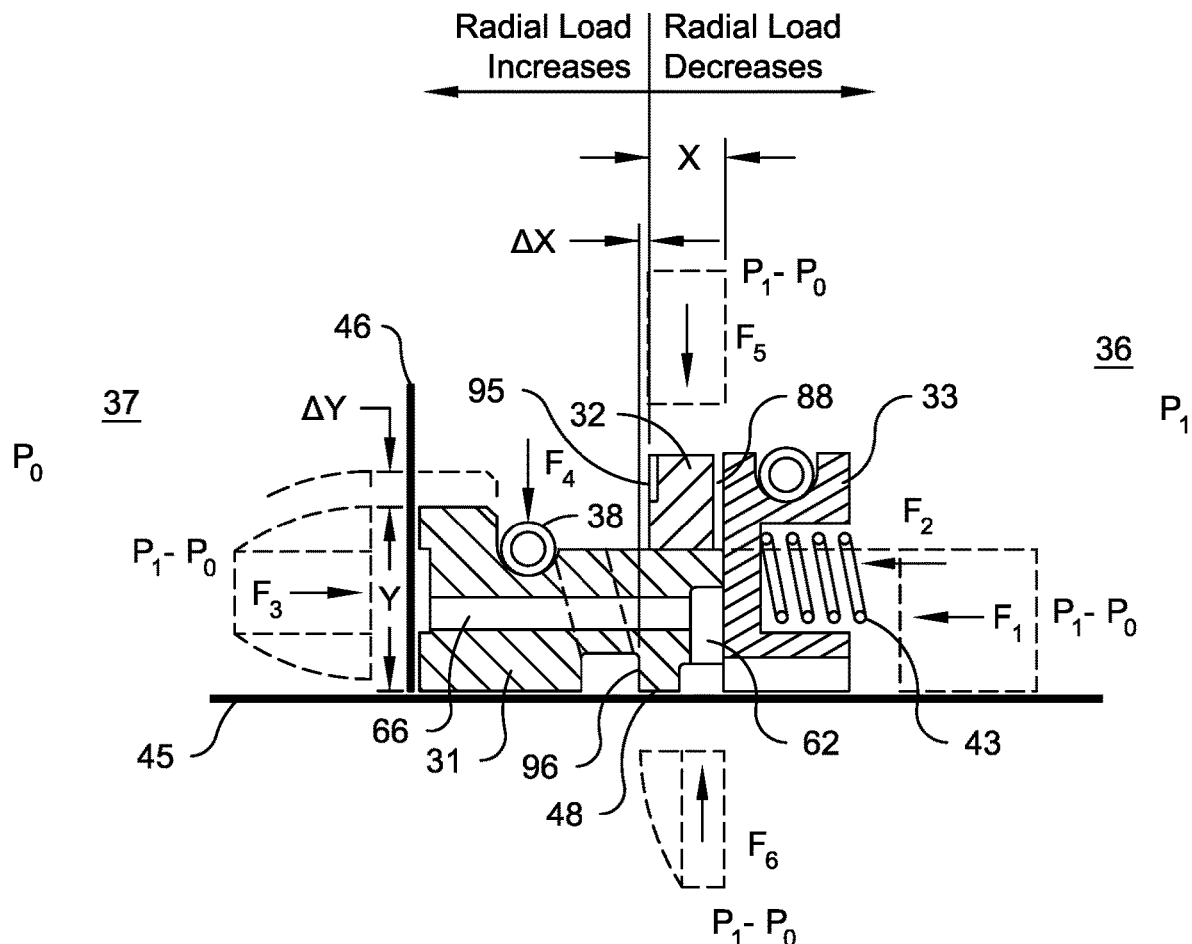
FIG. 9 is an enlarged cross-section view illustrating pressures and resultant forces communicated onto a primary sealing ring including a first channel and a vent channel in accordance with a radial contacting embodiment of the disclosure.

Referring now to FIGS. 9 and 2, pressures and pressure forces applied by fluid originating at the higher pressure side 36 are illustrated along a primary sealing ring 31 that sealingly contacts the radial sealing surface 45 and the face sealing surface 46. The pressure loading in FIG. 9 is generally understood to be the pressure differential across the circumferential seal assembly 30 ($P_1-P_0$) with applicable decay due to leakage where $P_1$ is the pressure within the higher pressure side 36 and $P_0$ is the pressure within the lower pressure side 37.

Referring again to FIGS. 9 and 2, the resultant force load at the radial sealing surface 45 is equal to the total of the spring force $F_4$ and the inward radial pressure force $F_5$ less the outward radial pressure force $F_6$ for a primary sealing ring 31 designed to contact a radial sealing surface 45. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48.

Referring again to FIGS. 9 and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Figure 10A:
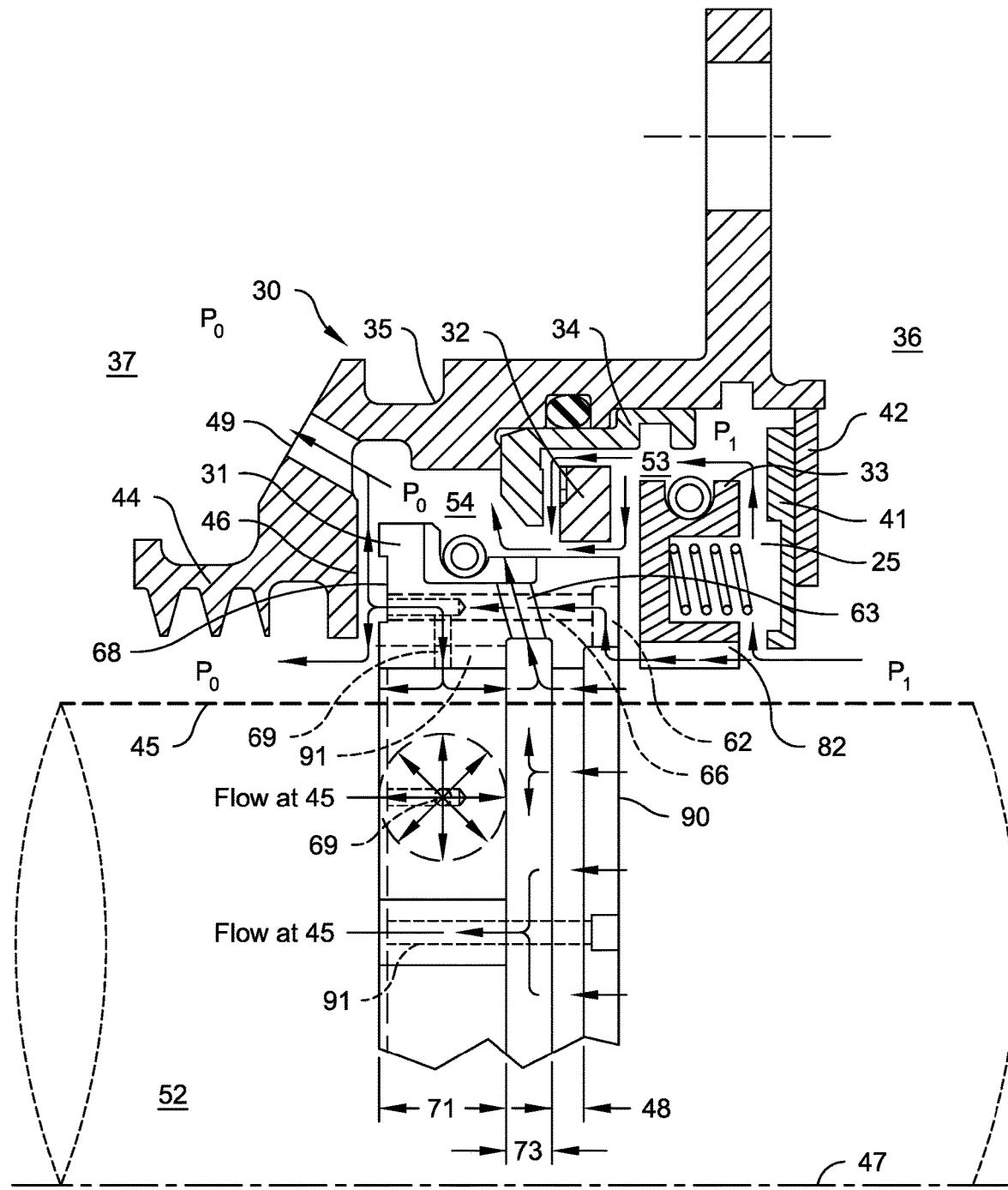
FIG. 10a is an upper cross-section, exploded view with lower side view illustrating flow across a circumferential seal assembly disposed between a higher pressure side and a lower pressure side whereby a primary sealing ring includes a first channel, a second channel or an optional bearing slot, and a vent channel in accordance with a hydrostatic embodiment of the disclosure.

Referring now to FIG. 10a, exemplary flow paths are shown through a circumferential seal assembly 30 whereby fluid originating at a higher pressure side 36 at a higher pressure $P_1$ is utilized for sealing purposes before the same fluid exits the circumferential seal assembly 30 and enters a lower pressure side 37 at a lower pressure $P_0$. It understood that fluid communicated onto the face sealing surface 46 and the radial sealing surface 45 may form a thin-film layer. The thin-film layer may enhance sealing function by the primary sealing ring 31 disposed about the rotatable element 52 along a rotational axis 47 and reduce pressure forces along the primary sealing ring 31 at the face sealing surface 46 and the radial sealing surface 45.

Referring again to FIG. 10a, fluid from the higher pressure side 36 passes through an annular opening between the retaining ring 42 and the rotatable element 52 and another annular opening between the back plate 41 and the rotatable element 52. The fluid then passes along the gap 25 between the back plate 41 and the third sealing ring 33 before entering the first cavity 53. In some embodiments, fluid may then partially or completely traverse one or more interfaces between the second sealing ring 32 and the insert 34, the third sealing ring 33 and the primary sealing ring 31 before entering the second cavity 54. It is understood that the flow rate, if any, between the first cavity 53 and the second cavity 54 is substantially less than the flow rate across other portions of the circumferential seal assembly 30.

Referring again to FIG. 10a, fluid also passes across the third sealing ring 33 via the bore grooves 82 before entering the vertical feed grooves 62. A portion of the fluid may pass under the seal bore dam 48 and thereafter enter the annular groove 73. Fluid within the vertical feed grooves 62 then enters and passes through the first channels 66 before exiting into the pocket 68. A portion of the fluid within the pocket 68 may then separate and flow across the face sealing surface 46 thereafter entering the second cavity 54 and the lower pressure side 37 via an annular opening adjacent to the windback 44. Another portion of the fluid within the pocket 68 may then enter the second channels 69 before exiting the primary sealing ring 31 along the pads 71. Fluid along the pads 71 may then separate and flow between the bore surface 90 along the primary sealing ring 31 and the radial sealing surface 45 before either entering the annular groove 73 or passing into the lower pressure side 37 adjacent to the windback 44. In some embodiments, fluid may be communicated via the second channels 69 into the bore grooves 70 along the seal segments 56 and/or optional bearing slots 91 along the bore surface 90.

Referring again to FIG. 10a, fluid within the annular groove 73 then passes into the vent channels 63 before exiting into the second cavity 54. Fluid within the second cavity 54 passes through the exhaust port(s) 49 along the housing 35 before entering the lower pressure side 37.

Figure 10B:
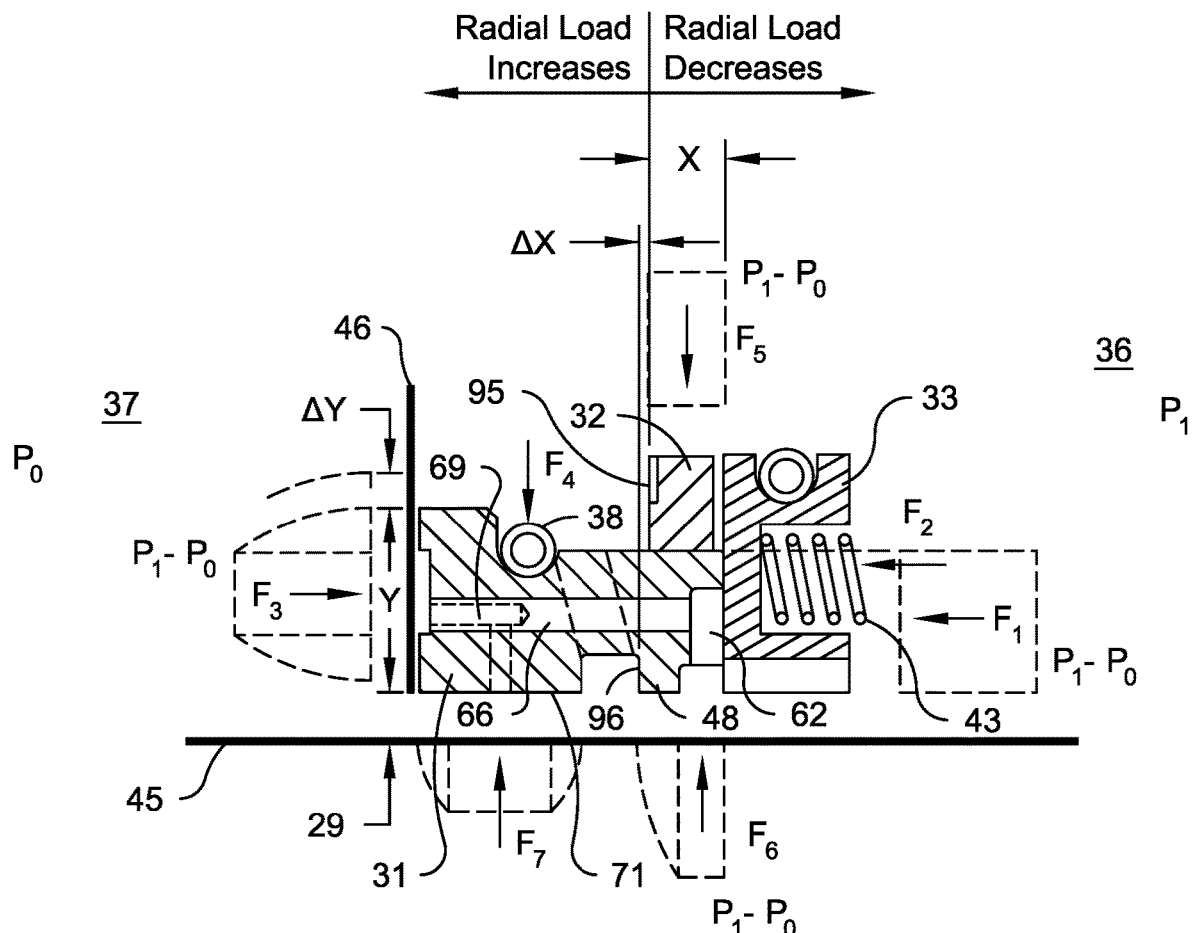
FIG. 10b is cross-section view illustrating pressures and resultant forces communicated onto the primary sealing ring including the first channel, the second channel, and the vent channel in accordance with a hydrostatic embodiment of the disclosure.

Referring now to FIGS. 10a, 10b and 2, pressures and pressure forces applied by fluid originating in the higher pressure side 36 are illustrated along a primary sealing ring 31 that sealingly engages the radial sealing surface 45 via a thin-film along the gap 29 and sealingly contacts the face sealing surface 46. The pressure loading in FIG. 10b is generally understood to be the pressure differential across the circumferential seal assembly 30 ($P_1-P_0$) with applicable decay due to leakage where $P_1$ is the pressure within the higher pressure side 36 and $P_0$ is the pressure within the lower pressure side 37.

Referring again to FIGS. 10b, 10a and 2, the resultant force load at the radial sealing surface 45 is equal to the total of the spring force $F_4$ and the inward radial pressure force $F_5$ less the total of the outward radial pressure force $F_6$ and the outward radial pressure force $F_7$. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48. The outward radial pressure force $F_7$ is applied onto the primary sealing ring 31 by fluid hydrostatically communicated at the pad 71 via the second channels 69.

Referring again to FIGS. 10b, 10a and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Figure 11A:
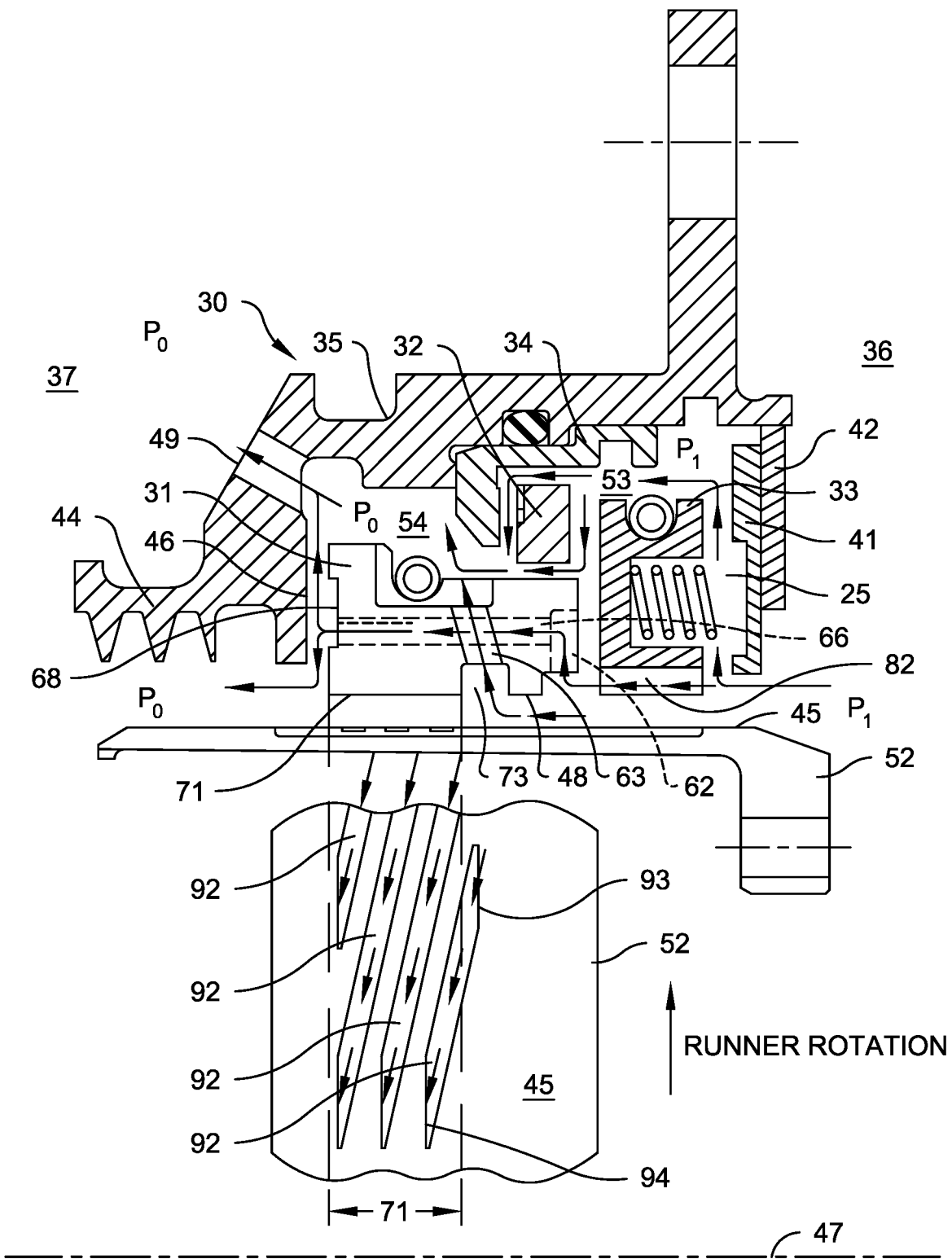
FIG. 11a is an upper cross-section, exploded view with lower side view illustrating flow across a circumferential seal assembly disposed between a higher pressure side and a lower pressure side whereby a primary sealing ring includes a first channel and a vent channel and a rotatable element includes a plurality of hydrodynamic grooves in accordance with a hydrodynamic embodiment of the disclosure.

Referring now to FIG. 11a, exemplary flow paths are shown through a circumferential seal assembly 30 whereby fluid originating at a higher pressure side 36 at a higher pressure $P_1$ is utilized for sealing purposes before the same fluid exits the circumferential seal assembly 30 and enters a lower pressure side 37 at a lower pressure $P_0$. It understood that fluid communicated onto the face sealing surface 46 and the radial sealing surface 45 may form a thin-film layer enhancing sealing function by the primary sealing ring 31 along the rotatable element 52, such as the runner disposed about a rotational axis 47 in FIG. 11a, and reducing pressure forces along the primary sealing ring 31 at the face sealing surface 46 and the radial sealing surface 45.

Referring again to FIG. 11a, fluid from the higher pressure side 36 passes through an annular opening between the retaining ring 42 and the rotatable element 52 and another annular opening between the back plate 41 and the rotatable element 52. The fluid then passes along the gap 25 between the back plate 41 and the third sealing ring 33 before entering the first cavity 53. In some embodiments, fluid may then partially or completely traverse one or more interfaces between the second sealing ring 32 and the insert 34, the third sealing ring 33 and the primary sealing ring 31 before entering the second cavity 54. It is understood that the flow rate, if any, between the first cavity 53 and the second cavity 54 is substantially less than the flow rate across other portions of the circumferential seal assembly 30.

Referring again to FIG. 11a, fluid also passes across the third sealing ring 33 via the bore grooves 82 before entering the vertical feed grooves 62. A portion of the fluid may pass under the seal bore dam 48 and before entering the annular groove 73. Fluid within the vertical feed grooves 62 then enters and passes through the first channels 66 before exiting into the pocket 68. The fluid within the pocket 68 may then separate and flow across the face sealing surface 46 thereafter entering the second cavity 54 and the lower pressure side 37 via an annular opening adjacent to the windback 44.

Referring again to FIG. 11a, the rotatable element 52 may include a plurality of hydrodynamic grooves 92 disposed along the radial sealing surface 45. A first end 93 of the hydrodynamic groove 92 communicates with fluid at the higher pressure side 36. The hydrodynamic groove 92 is oriented with respect to rotation of the rotatable element 52 so that fluid is captured at the first end 93 thereafter traveling along the hydrodynamic groove 92 with increasing pressure. The fluid is then redirected upward at a second end 94 of the hydrodynamic groove 92 onto the primary sealing ring 31, preferably at the end with the pad 71. Fluid along the pads 71 may flow into the lower pressure side 37 and/or the annular groove 73.

Referring again to FIG. 11a, fluid within the annular groove 73 then passes into the vent channels 63 before exiting into the second cavity 54. Fluid within the second cavity 54 passes through the exhaust port(s) 49 along the housing 35 before entering the lower pressure side 37.

Figure 11B:
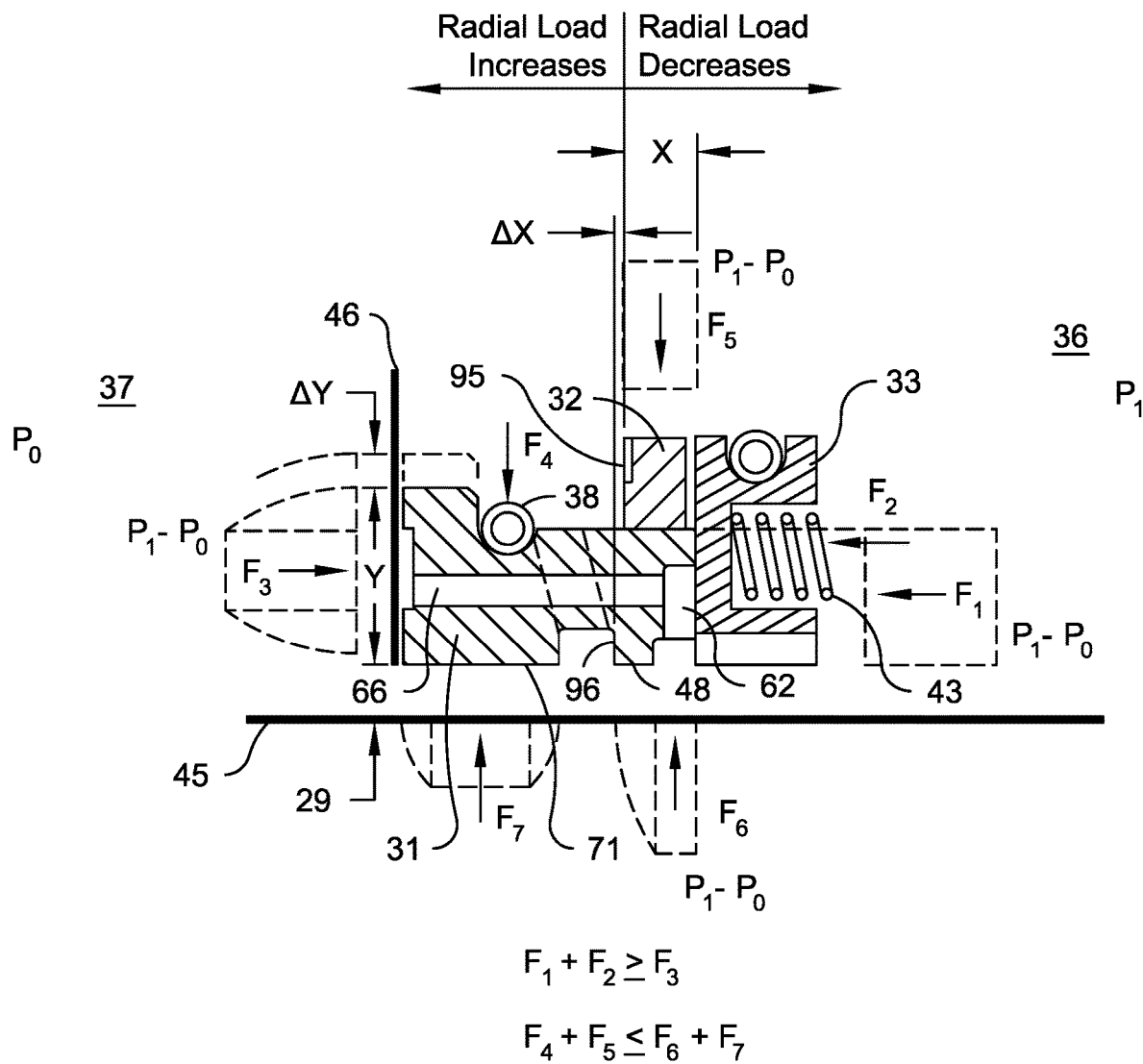
FIG. 11b is cross-section view illustrating pressures and resultant forces communicated onto the primary sealing ring including the first channel and the vent channel and the rotatable element includes hydrodynamic grooves in accordance with a hydrodynamic embodiment of the disclosure.

Referring now to FIGS. 11b, 11a and 2, pressures and pressure forces applied by fluid originating in the higher pressure side 36 are illustrated along a primary sealing ring 31 that sealingly engages the radial sealing surface 45 via a thin-film along the gap 29 and sealingly contacts the face sealing surface 46. The pressure loading in FIG. 11b is generally understood to be the pressure differential across the circumferential seal assembly 30 ($P_1-P_0$) with applicable decay due to leakage where $P_1$ is the pressure within the higher pressure side 36 and $P_0$ is the pressure within the lower pressure side 37.

Referring again to FIGS. 11b, 11a and 2, the resultant force load at the radial sealing surface 45 is equal to the total of the spring force $F_4$ and the inward radial pressure force $F_5$ less the total of the outward radial pressure force $F_6$ and the outward radial pressure force $F_7$. The spring force $F_4$ is applied onto the primary sealing ring 31 via the garter spring 38. The inward radial pressure force $F_5$ is applied onto the primary sealing ring 31 by the second sealing ring 32 in response to fluid within the first cavity 53 acting on the second sealing ring 32. The outward radial pressure force $F_6$ is applied onto the primary sealing ring 31 by fluid at the vertical feed grooves 62 and the seal bore dams 48. The outward radial pressure force $F_7$ is applied onto the primary sealing ring 31 by fluid hydrodynamically communicated at the pad 71 via the hydrodynamic grooves 92.

Referring again to FIGS. 11b, 11a and 2, the resultant force load at the face sealing surface 46 is equal to the total of the aft axial pressure force $F_1$ and the spring force $F_2$ less the forward axial pressure force $F_3$. The aft axial pressure force $F_1$ is applied onto the primary sealing ring 31 by the third sealing ring 33 in response to fluid within the gap 25 acting on the third sealing ring 33. The spring force $F_2$ is applied onto the primary sealing ring 31 via the compression springs 43. The forward axial pressure force $F_3$ is applied onto the primary sealing ring 31 by fluid communicated onto the face sealing surface 46 via the first channels 66.

Referring now to FIGS. 9, 10b and 11b, the resultant pressure force at the face sealing surface 46 is adjusted via changes to the radial height Y of the primary sealing ring 31. The resultant pressure force increases when the radial height Y is decreased by a radial adjustment $\Delta Y$ causing a corresponding decrease to the forward axial pressure force $F_3$. The resultant pressure force decreases when the radial height Y is increased by a radial adjustment $\Delta Y$ causing a corresponding increase to the forward axial pressure force $F_3$.

Figure 12A:
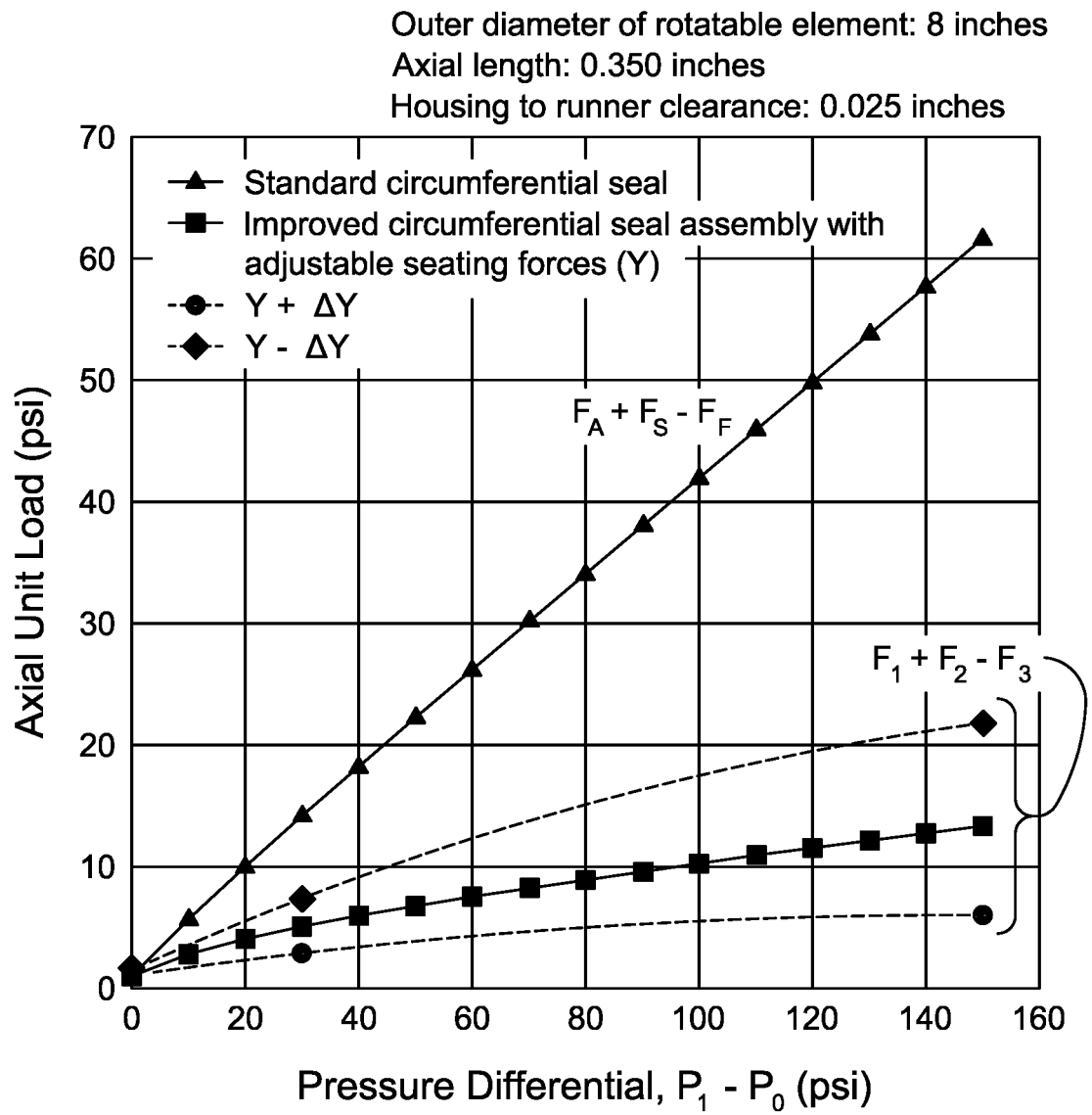
FIG. 12a is an exemplary plot illustrating axial load versus pressure differential for a contacting embodiment of the circumferential seal assembly of the present disclosure and for a standard circumferential seal.

Referring now to FIG. 12a, the resultant pressure forces at the face sealing surface 46 are illustrated in exemplary form whereby axial unit load is plotted over a range of pressure differentials across a standard circumferential seal such as in FIG. 1 and an improved contacting circumferential seal such as in FIG. 2. The improved seal with a radial height Y significantly reduces the axial unit load in comparison to the standard seal whereby the reductions achievable by the improved seal are greater at higher pressure differentials. The curves for radial adjustments $\pm \Delta Y$ within an exemplary range demonstrate that the reduction in the axial load profile does not sacrifice the adjustability required to optimize the circumferential seal assembly 30 for particular applications.

Referring again to FIGS. 9, 10b and 11b, the resultant pressure force at the radial sealing surface 45 is adjusted via changes to the relative position of the second sealing ring 32 with respect to the seal bore dam 48. Adjustments made to the second sealing ring 32 may require dimensional and positional adjustments to the insert 34 so as to maintain the proper sealing engagement therebetween.

Referring again to FIGS. 9, 10b and 11b, the magnitude of the resultant pressure force increases when the axial position of the second sealing ring 32 is adjusted toward the lower pressure side 37. The adjustment $\Delta X$ is implemented by reducing the axial distance between the second sealing ring 32 and the lower pressure side 37 so that the axial width X over which the inward radial pressure force $F_5$ acts is increased. In one example, the second sealing ring 32 may be physically moved toward the lower pressure side 37 without adjustment to the axial width of the second sealing ring 32.

Referring again to FIGS. 9, 10a and 10b, the magnitude of the resultant pressure force decreases when the axial position of the second sealing ring 32 is moved toward the higher pressure side 36. The adjustment $\Delta X$ is implemented by increasing the axial distance between the second sealing ring 32 and the lower pressure side 37 so that the axial width X over which the inward radial pressure force $F_5$ acts is decreased. In one example, the second sealing ring 32 may be physically moved toward the higher pressure side 36 without adjustment to the axial width of the second sealing ring 32.

Referring again to FIGS. 9, 10a and 10b, the face 95 of the second sealing ring 32 is either aligned with the face 96 of the seal bore dam 48 or closer to the higher pressure side 36 than the face 96 in preferred embodiments so that an adjustment $\Delta X$ to the second sealing ring 32 in the direction of the lower pressure side 37 decreases the axial distance between the faces 95, 96 and so that an adjustment $\Delta X$ in the direction of the higher pressure side 36 increases the axial distance between the faces 95, 96.

Figure 12B:
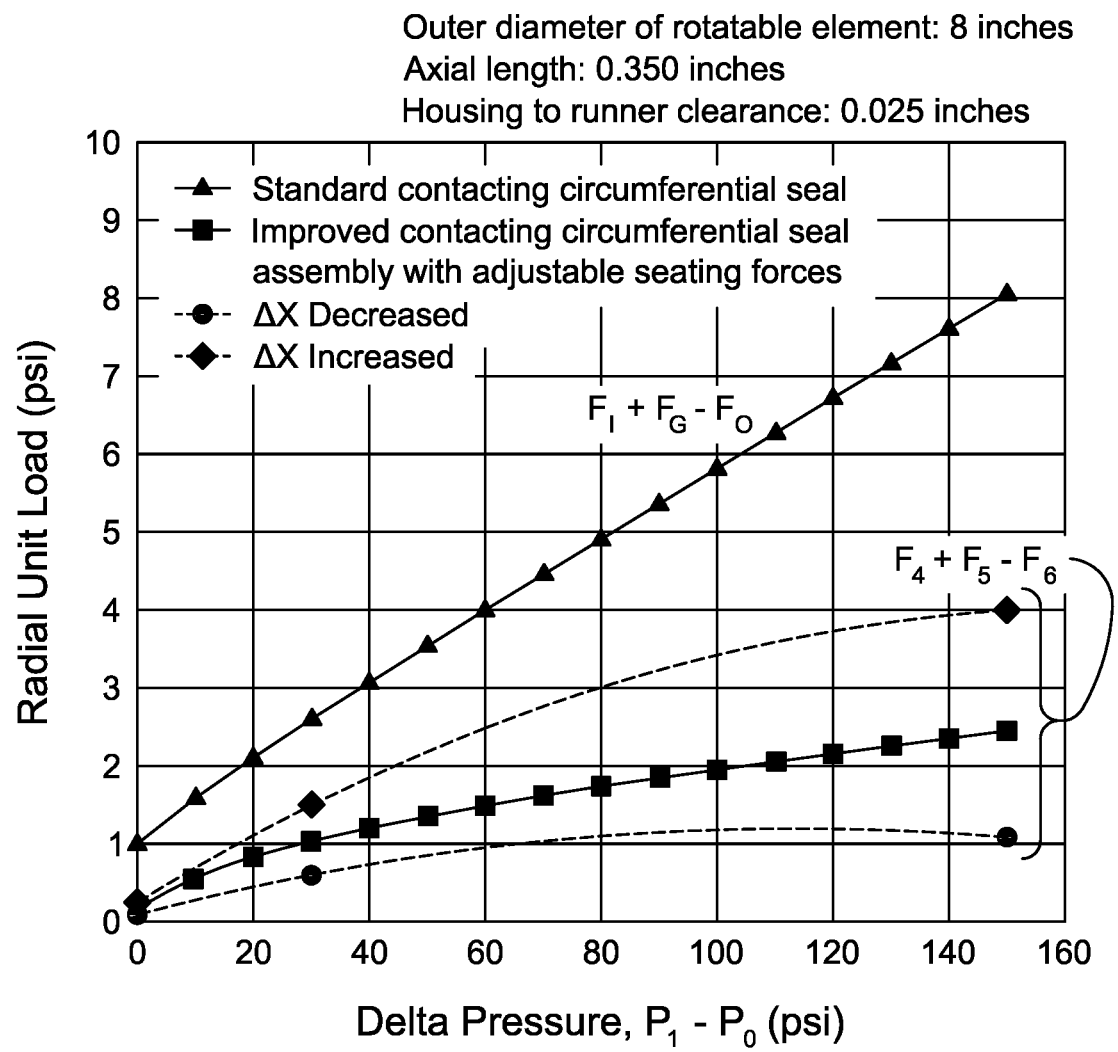
FIG. 12b is an exemplary plot illustrating radial load versus pressure differential for a contacting embodiment of the circumferential seal assembly of the present disclosure and for a standard circumferential seal.

Referring now to FIG. 12b, the resultant pressure force at the radial sealing surface 45 is illustrated in exemplary form whereby radial unit load is plotted over a range of pressure differentials across a standard circumferential seal such as in FIG. 1 and an improved contacting circumferential seal such as in FIG. 2. The improved seal significantly reduces the radial unit load in comparison to the standard seal whereby the reductions achievable by the improved seal are greater at higher pressure differentials. The curves for adjustments ΔX within an exemplary range demonstrate that the reduction in the radial load profile does not sacrifice the adjustability required to optimize the circumferential seal assembly 30 for particular applications. It is understood from FIG. 12*b* that additional improvements are realized by inclusion of the hydrostatic lift in FIG. 10*a* and/or the hydrodynamic lift in FIG. 11*a*.

Referring again to FIGS. 2-11*b*, the circumferential seal assembly 30 includes a primary sealing ring 31, an insert 34, a second sealing ring 32, and a third sealing ring 33. The primary sealing ring 31 is disposed within a housing 35 along a rotatable element 52. The primary sealing ring 31 sealingly engages both a face sealing surface 46 along the housing 35 and a radial sealing surface 45 along the rotatable element. 52 The primary sealing ring 31 includes at least two seal segments 56. The insert 34 is disposed within and directly contacts the housing 35. The second sealing ring 32 is adjacent to the primary sealing ring 31. The second sealing ring 32 sealingly engages the primary sealing ring 31 and the insert 34. The third sealing ring 33 contacts and sealingly engages the primary sealing ring 31 opposite of sealing engagement with the housing 35. The third sealing ring 33 includes at least two ring segments 81. The insert 34, the second sealing ring 32, and the third sealing ring 33 define a first cavity 53 adjacent to the second sealing ring 32 and the third sealing ring 33. The primary sealing ring 31, the second sealing ring 32, the insert 34, and the housing 35 define a second cavity 54 adjacent to the primary sealing ring 31. The insert 34 and the second sealing ring 32 separate the first cavity 53 from the second cavity 54.

Referring again to FIGS. 2-11*b*, the circumferential seal assembly 30 may include one or more of the following optional features.

The rotatable element 52 may be either a shaft or a runner disposed along a shaft. The first cavity 53 may be at higher pressure and the second cavity 54 may be at lower pressure.

The primary sealing ring 31 may include a seal bore dam 48 biased toward the third sealing ring 33 so that the seal bore dam 48 sealingly engages the radial sealing surface 45.

A fluid may traverse the radial sealing surface 45 adjacent to the third sealing ring 33 before entering the primary sealing ring 31.

A seal segment 56 may include at least one vertical feed groove 62 disposed along an inlet side 61 and at least one substantially horizontal first channel 66 that traverses the seal segment 56 between the inlet side 61 and an outlet side 72 so that the vertical feed groove 62 and the first channel 66 permit a fluid originating from the higher pressure side 36 to traverse the seal segment 56 so as to impinge the face sealing surface 46.

A seal segment 56 may include at least one pocket 68 at the outlet side 72 communicable with at least one first channel 66.

A seal segment 56 may include at least one second channel 69 communicable at one end with a pocket 68 so that the second channel 69 permits a fluid to reenter the seal segment 56 for communication at another end of the second channel 69 onto the radial sealing surface 45.

A plurality of hydrodynamic grooves 92 may be disposed along the radial sealing surface 45 adjacent to the primary sealing ring 31 so that the hydrodynamic grooves 92 redirects a fluid exiting a second channel 69 onto the primary sealing ring 31.

A seal segment 56 may include at least one vent channel 63 communicable at one end with the radial sealing surface 45 and at another end with the second cavity 54 so that the vent channel 63 permits a fluid to traverse the seal segment 56 before entering the second cavity 54.

A plurality of hydrodynamic grooves 92 may be disposed along the radial sealing surface 45 adjacent to the primary sealing ring 31 so that the hydrodynamic grooves 92 direct a fluid onto the primary sealing ring 31.

A seal segment 56 may include at least one vent channel 63 communicable at one end with a gap interposed between the seal segment 56 and the radial sealing surface 45 and at another end with the second cavity 54 so that the vent channel 63 permits a fluid to traverse the seal segment 56 and enter the second cavity 54.

The housing 35 may include at least one exhaust port 49 that permits a fluid to exit the second cavity 54.

A gap may be interposed between the second sealing ring 32 and the third sealing ring 33.

A fluid originating from the higher pressure side 36 may traverse the first cavity 53 and pass around the second sealing ring 32 before entering the second cavity 54.

A seal segment 56 may include a vertical flange 58 at one end of a horizontal flange 57 so that the vertical flange 58 sealingly engages the face sealing surface 46.

A resultant pressure force along the face sealing surface 46 may increase when a radial height of a vertical flange 58 is reduced by a radial adjustment.

A resultant pressure force along the face sealing surface 46 may decrease when a radial height of a vertical flange 58 is increased by a radial adjustment.

A resultant pressure force along the radial sealing surface 45 may increase when the second sealing ring 32 is adjusted toward the lower pressure side 37.

A resultant pressure force along the radial sealing surface 45 may decrease when the second sealing ring 32 is adjusted away from the lower pressure side 37.

The radial sealing surface 45 may be disposed along either an outer circumferential surface 103 of the rotatable element 52 or an inner circumferential surface 102 of the rotatable element 52.

The third sealing ring 33 may comprise a metal and may be biased in the direction of the primary sealing ring 31 via a spring 97 disposed between and directly contacting the third sealing ring 33 and a retaining ring 42 secured to the housing 35.

An annular gap 100 may be disposed between the third sealing ring 33 and the rotatable element 52.

The primary sealing ring 31 may be biased outward in the direction of the rotatable element 52 via a plurality of springs 98.

The insert 34 may be integral with the housing 35.

Figure 13:
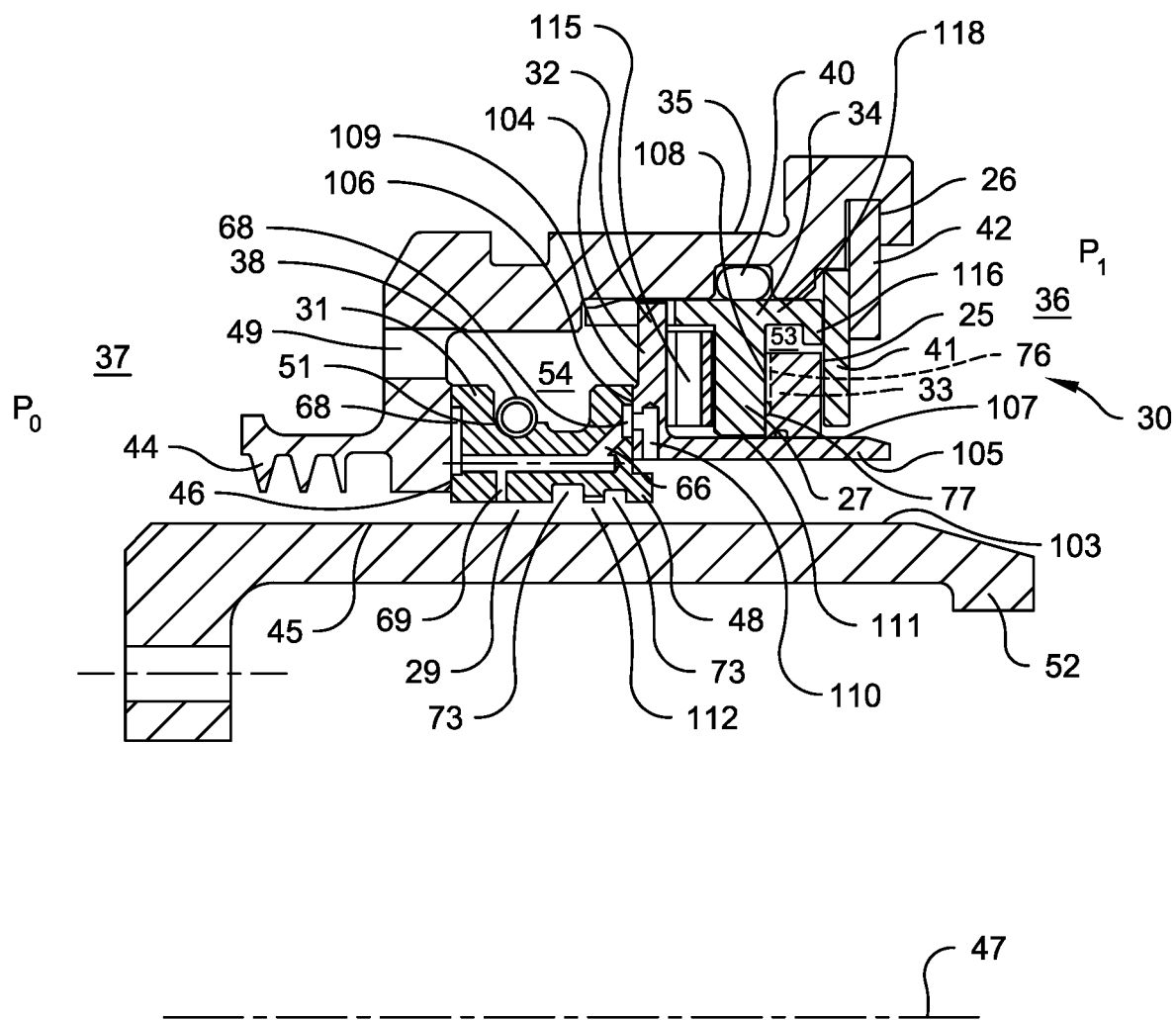
FIG. 13 is an enlarged cross-section view illustrating a circumferential seal assembly including a primary sealing ring, a second sealing ring, a third sealing ring, and an insert disposed within a housing which define and separate a first cavity and a second cavity whereby a seal is formed along an outer circumferential surface of a rotatable element via the primary sealing ring, the second sealing ring sealingly engages a face surface of the primary sealing ring, and the third sealing ring sealingly engages an outer cylindrical surface of the second sealing ring in accordance with an embodiment of the disclosure.

Referring now to FIG. 13, a circumferential seal assembly 30 is shown disposed within a housing 35 about a rotatable element 52. The circumferential seal assembly 30 generally comprises a primary sealing ring 31, a second sealing ring 32, a third sealing ring 33, and an insert 34. Components for the circumferential seal assembly 30 are secured within the housing 35 preferably via securing means understood in the art, non-limiting examples including a back plate 41 and a retaining ring 42. Components of the circumferential seal assembly 30 are composed of materials suitable for the intended applications, examples including but not limited to metals, ceramics, and non-metals, one non-limiting example being carbon graphite.

Referring again to FIG. 13, the circumferential seal assembly 30, the housing 35, and the rotatable element 52 are aligned along and disposed about a rotational axis 47, often coinciding with the rotational axis within a turbine engine. The rotatable element 52 is broadly defined to include a rotatable shaft or the like with or without elements extending therefrom, one non-limiting example being a runner.

Referring again to FIG. 13, the circumferential seal assembly 30, the housing 35, and the rotatable element 52 generally cooperate to define and to separate a higher pressure side 36 and a lower pressure side 37. The housing 35 is attached to structural components (not shown) of a turbine engine via methods understood in the art so as to secure the circumferential seal assembly 30 therein. In this arrangement, the circumferential seal assembly 30 and the housing 35 are non-rotating. The configuration of the housing 35 is design dependent; however, it is understood for purposes of the present disclosure that the housing 35 cooperates with the circumferential seal assembly 30 and the rotatable element 52 to define two separate compartments whereby one fluid, such as a lubricant, resides at a lower pressure within a compartment coinciding with the lower pressure side 37 and another fluid, such as a gas, resides at a higher pressure within a compartment coinciding with the higher pressure side 36.

Referring again to FIG. 13, the primary sealing ring 31 is disposed within the housing 35 so as to sealingly engage the rotatable element 52 along an outer surface thereof over a region referred to as the radial sealing surface 45. While the radial sealing surface 45 is shown along the outer circumferential surface 103 of the rotatable element 52, it is understood that the radial sealing surface 45 may be disposed along the inner surface of a rotatable element 52 in other embodiments of the disclosure. The primary sealing ring 31 also sealingly engages an inside surface along the housing 35 over a region referred to as a face sealing surface 46 adjacent to the lower pressure side 37. It is further understood that the face sealing surface 46 may be adjacent to an optional windback 44 which extends from the housing 35 into the lower pressure side 37. Sealing engagement is generally understood to mean a non-contact arrangement and/or a contact arrangement that limits, prevents, or controls the flow of fluids between the higher pressure side 36 and the lower pressure side 37. In preferred embodiments, sealing engagement may be implemented via a thin-film fluid layer. In one specific example, the thin-film layer may be disposed along a gap 29 between the primary sealing ring 31 and the rotatable element 52.

Referring again to FIG. 13, the primary sealing ring 31 has an outer surface and an inner surface. The outer circumferential surface of the primary sealing ring 31 includes a spring groove 51. The spring groove 51 accepts a garter spring 38 which urges or biases the primary sealing ring 31 in the direction of the radial sealing surface 45. The inner circumferential surface of the primary sealing ring 31 includes a seal bore dam 48 and an annular groove 73. In preferred embodiments, the seal bore dam 48 is biased toward the second sealing ring 32 and away from the housing 35. In some embodiments, the primary sealing ring 31 may include a second annular groove 73 with a flow deflector 112 interposed between the paired arrangement of annular grooves 73. The primary sealing ring 31 may include one or more other features described herein from other embodiments of the disclosure.

Referring again to FIG. 13, the insert 34 directly contacts a portion of the inner surface of the housing 35. The insert 34 in some embodiments may be integral with the housing 35 or in other embodiments a separate component from the housing 35. In preferred embodiments, the insert 34 is a ring-shaped element configured to contact and thereby securable within the housing 35. The insert 34 includes an inward flange 27 and an annular ring portion 118. The inward flange 27 extends inwardly with respect to the annular ring portion 118. In preferred embodiments, the inward flange 27 is configured to not contact the second sealing ring 32. An O-ring 40 is positioned between the housing 35 and the annular ring portion 118 so as to prevent fluid from completely traversing the interface therebetween when the insert 34 is not integral to the housing 35. The insert 34 may include one or more other features described herein from other embodiments of the disclosure.

Referring again to FIG. 13, the second sealing ring 32 includes a ring portion 104 and a cylindrical portion 105. The ring portion 104 is positioned between the primary sealing ring 31 and the insert 34. The second sealing ring 32, and more particularly the ring portion 104, sealingly engages a face surface 106 of the primary sealing ring 31. The second sealing ring 32, and more particularly the cylindrical portion 105, may optionally sealingly engage the end of the inward flange 27 at a gap 111 between the inward flange 27 and the cylindrical portion 105. In preferred embodiments, the second sealing ring 32 is a ring-shaped element with a single gap 80, the latter feature illustrated by way of a non-limiting example in FIG. 5. The second sealing ring 32 may include one or more other features described herein from other embodiments of the disclosure.

Referring again to FIG. 13, the third sealing ring 33 is positioned so as to overlay the cylindrical portion 105. This arrangement radially positions the third sealing ring 33 between the cylindrical portion 105 of the second sealing ring 32 and the annular ring portion 118 of the insert 34. In preferred embodiments, the third sealing ring 33 is positioned to sealingly engage a flange face 108 along the inward flange 27 and to sealingly engage an outer cylindrical surface 107 along the cylindrical portion 105. A feed groove 76 and a face groove 77 may be disposed along the third sealing ring 33 adjacent to the flange face 108. In preferred embodiments, the third sealing ring 33 may include at least two ring segments 81 disposed in an end-to-end arrangement forming a ring-shaped structure. In preferred embodiments, the third sealing ring 33 is a ring-shaped element with a single gap which permits expansion. The third sealing ring 33 may include one or more other features described herein from other embodiments of the disclosure.

Referring again to FIG. 13, the housing 35 may include a groove 26 which accepts the retaining ring 42. The back plate 41 is a ring-shaped element disposed between the retaining ring 42 and the third sealing ring 33. The insert 34 and the back plate 41 cooperate to form a pocket for the third sealing ring 33. A gap 25 between the back plate 41 and the third sealing ring 33 permits axial displacement by the third sealing ring 33.

Referring again to FIG. 13, the insert 34 and the third sealing ring 33 are configured to cooperate to surround a region referred to as a first cavity 53. In preferred embodiments, the first cavity 53 is generally defined by an optional extraction flange 116, the annular ring portion 118, and the inward flange 27 of the insert 34 and by the third sealing ring 33. The first cavity 53 is communicable with the higher pressure side 36 via the gap 25. The gap 25 permits exchange of fluid between the first cavity 53 and the higher pressure side 36.

Referring again to FIG. 13, the primary sealing ring 31, the second sealing ring 32, and the housing 35 are configured to cooperate to enclose a region referred to as a second cavity 54. In preferred embodiments, the second cavity 54 is generally defined by the interface 109 in part at one side of the ring portion 104 of the second sealing ring 32, the outer circumferential surface of the primary sealing ring 31, and the inner surface of the housing 35. The second cavity 54 is communicable with the lower pressure side 37 via at least one exhaust port 49 along the housing 35. The exhaust port 49 is a hole disposed through the housing 35 which permits exchange of fluid between the second cavity 54 and the lower pressure side 37.

Referring again to FIG. 13, the second sealing ring 32 and the insert 34 are interposed between the first cavity 53 and the second cavity 54. In preferred embodiments, the ring portion 104 and the cylindrical portion 105 of the second sealing ring 32 cooperate with the inward flange 27 and the annular ring portion 118 of the insert 34 to separate and/or to minimize mixing of fluid from the higher pressure side 36 and the first cavity 53 and fluid from the lower pressure side 37 and the second cavity 54. One or more springs 115 may be interposed between and contact the ring portion 104 and the inward flange 27. A single spring 115 is adapted for use within preferred embodiments, one non-limiting example being a wave-type element. The spring 115 at one end biases the interface 109 of the ring portion 104 into sealing engagement with the face surface 106 of the primary sealing ring 31. The spring 115 at another end biases the annular ring portion 118 with optional extraction flange 116 into sealing engagement with the back plate 41. The arrangement of the second sealing ring 32 and the insert 34 with or without the spring(s) 115 provides separation between the first cavity 53 and the second cavity 54 thereby preventing fluids originating in the higher pressure side 36 from bypassing and negating sealing function by the circumferential seal assembly 30. However, it is understood that fluid may slowly bleed across the circumferential seal assembly 30 as permitted by features of the design.

Referring again to FIG. 13, the primary sealing ring 31 includes two or more seal segments which in combination form a ring-shaped structure referred to as a segmented ring. In preferred embodiments, the primary sealing ring 31 and the second sealing ring 32 may include features therethrough which permit fluid at the higher pressure side 36 to flow to the face sealing surface 46 and the radial sealing surface 45. This fluid may be utilized to form and/or to maintain a thin-film seal between the primary sealing ring 31 and the housing 35 at the face sealing surface 46 and/or between the primary sealing ring 31 and the rotatable element 52 at the radial sealing surface 45. The primary sealing ring 31 may include one or more optional features described in FIGS. 3a-3g.

Referring again to FIG. 13, the second sealing ring 32 may include one or more feed channels 110. The feed channel 110 traverses the second sealing ring 32 from the inner diameter to the interface 109. In preferred embodiments, each feed channel 110 is biased toward the ring portion 104 so as to permit fluid at the higher pressure side 36 to enter the second sealing ring 32 adjacent to the rotatable element 52 and to exit the second sealing ring 32 onto the face surface 106 of the primary sealing ring 31.

Referring again to FIG. 13, the primary sealing ring 31 may include one or more first channels 66. In preferred embodiments, the first channel 66 completely traverses the primary sealing ring 31 from end-to-end thereby providing a pathway from one face of the primary sealing ring 31 to another face of the primary sealing ring 31. In other preferred embodiments, the first channel 66 intersects and communicates with a pocket 68 at one or both faces of the primary sealing ring 31. One continuous pocket 68 or two or more pockets 68 may reside along a face. The pocket(s) 68 at the face surface 106 communicates with the feed channel(s) 110 of the second sealing ring 32. One or more optional second channels 69 may intersect the first channel 66 within the primary sealing ring 31. The second channel(s) 69 permits a pathway from the first channel 66 to the inner diameter of the primary sealing ring 31. The number, arrangement, and dimensions of the first channel 66, the second channel 69, the pocket 68, and the feed channel 110 are design dependent based on the flow requirements at the radial sealing surface 45 and the face sealing surface 46.

Referring again to FIG. 13, a fluid in preferred embodiments enters the feed channel(s) 110 at the inner circumferential surface of the second sealing ring 32. The fluid traverses the feed channel(s) 110 and is directed into the pocket(s) 68 along the face surface 106. The fluid then enters the first channel(s) 66 of the primary sealing ring 31 via the pocket(s) 68. The fluid traverses the primary sealing ring 31 via the first channel(s) 66. In other embodiments, the second channel(s) 69 communicates at one end with the slot(s) 68 to complete the pathway from the first channel 66. At least a portion of the fluid is communicated to pocket(s) 68 along the face of the primary sealing ring 31 adjacent to the face sealing surface 46 whereby the fluid forms a thin-film sealing layer between the housing 35 and the primary sealing ring 31. Another portion of the fluid is communicated onto the rotating element 52 via the second channel(s) 69 whereby the fluid forms a thin-film sealing layer along the gap 29 between the primary sealing ring 31 and the rotatable element 52.

Figure 14:
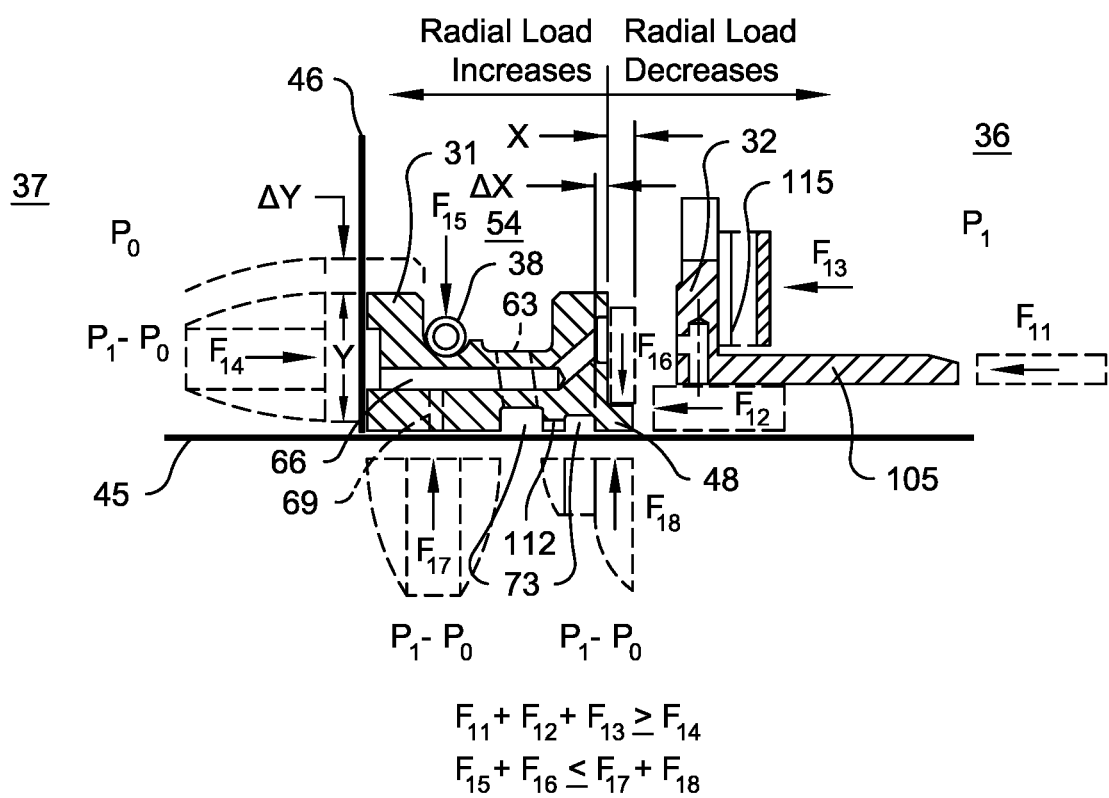
FIG. 14 is an exploded cross-section view illustrating pressures and resultant forces within a circumferential seal assembly for sealing an outer circumferential surface of a rotatable element in accordance with an embodiment of the disclosure.

Referring now to FIGS. 14 and 13, pressures and pressure forces are illustrated, by way of a non-limiting example, along a primary sealing ring 31 configured to sealingly engage both the radial sealing surface 45 and the face sealing surface 46 wherein the radial sealing surface 45 is along an outer circumferential surface 103 of the rotatable element 52. The pressure loading is generally understood to be the pressure differential across the circumferential seal assembly 30 ($P_1 - P_0$) with applicable decay due to leakage where $P_1$ is the pressure within the higher pressure side 36 and $P_0$ is the pressure within the lower pressure side 37.

Referring again to FIGS. 14 and 13, the resultant force load at the radial sealing surface 45 is equivalent to the total of the spring force $F_{15}$ and the inward radial pressure force $F_{16}$ less the total of the outward radial pressure forces $F_{17}$, $F_{18}$. The spring force $F_{15}$ is applied onto the primary sealing ring 31 via the garter spring 38. The inward radial pressure force $F_{16}$ is applied onto the primary sealing ring 31 by fluid from the higher pressure side 36. The outward radial pressure forces $F_{17}$, $F_{18}$ are applied onto the primary sealing ring 31 by fluid adjacent to the second channel 69 and by fluid acting at the flow deflector 112, the annular groove 73, and the seal bore dams 48. The flow deflector 112 is a bore dam with multiple shallow thru slots to reduce the pressure in the first annular groove 73. The pressure force is negligible within the second annular groove 73 because of the pressure breakdown permitted by a vent channel(s) 63 through the primary sealing ring 31 which allows fluid to exit the second annular groove 73 and enter the second cavity 54.

Referring again to FIGS. 14 and 13, the resultant force load at the face sealing surface 46 is equivalent to the total of the aft axial pressure forces $F_{11}$, $F_{12}$ and the spring force $F_{13}$ less the forward axial pressure force $F_{14}$. The aft axial pressure force $F_{11}$ is indirectly applied onto the primary sealing ring 31 via fluid originating from the higher pressure side 36 which acts on the cylindrical portion 105 of the second sealing ring 32. The aft axial pressure force $F_{12}$ is directly applied onto the primary sealing ring 31 adjacent to the seal bore dam 48 by fluid originating from the higher pressure side 36. The spring force $F_{13}$ is indirectly applied onto the primary sealing ring 31 via the spring(s) 115 acting on the second sealing ring 32. The forward axial pressure force $F_{14}$ is applied onto the primary sealing ring 31 by fluid communicated onto the face sealing surface 46 via the first channel(s) 66.

Referring again to FIGS. 14 and 13, the resultant pressure seating force at the radial sealing surface 45 is adjusted via adjustments to the primary sealing ring 31 adjacent to the seal bore dam 48. The resultant pressure seating force decreases when the seal face surface 106 is adjusted in the direction of the higher pressure side 36. The resultant pressure seating force increases when the seal face surface 106 is adjusted in the direction of the lower pressure side 37.

Referring again to FIGS. 14 and 13, the resultant pressure seating force at the face sealing surface 46 is adjusted via adjustments to the primary sealing ring 31 adjacent to the face sealing surface 46. The resultant pressure seating force decreases when the primary sealing ring 31 is adjusted outward. The resultant pressure seating force increases when the primary sealing ring 31 is adjusted inward.

Figure 15:
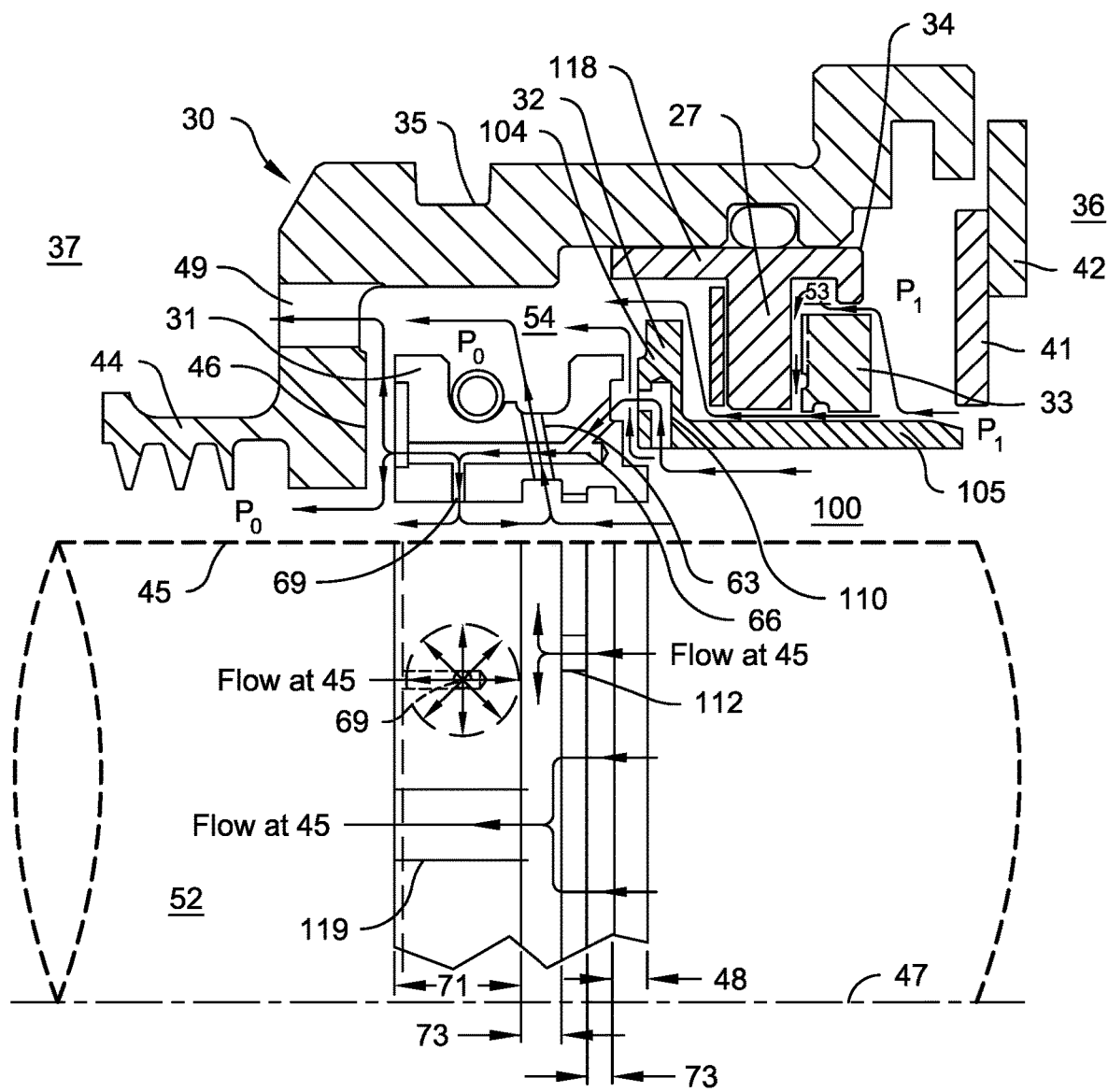
FIG. 15 is an exploded cross-section view of a circumferential seal assembly with a side view of a rotatable element illustrating flow within the seal assembly between a higher pressure side and a lower pressure side whereby the seal assembly seals an outer circumferential surface of the rotatable element via a primary sealing ring, a second sealing ring sealingly engages a face surface of the primary sealing ring, and a third sealing ring sealingly engages an outer cylindrical surface of the second sealing ring in accordance with an embodiment of the disclosure.

Referring now to FIG. 15, flow paths are shown through a circumferential seal assembly 30 whereby fluid originating at a higher pressure side 36 at a higher pressure $P_1$ is utilized for sealing purposes before the same fluid exits the circumferential seal assembly 30 and enters a lower pressure side 37 at a lower pressure $P_0$. Other flow paths may be possible; therefore, the illustrated flow paths are not intended to be limiting. It is understood that fluid communicated onto the face sealing surface 46 and the radial sealing surface 45 may form a thin-film layer between adjoining components. The thin-film layer may enhance sealing function by the primary sealing ring 31 disposed about the rotatable element 52 rotatable about a rotational axis 47, and may reduce the pressure seating forces along the primary sealing ring 31 at the face sealing surface 46 and the radial sealing surface 45. It is also understood that the fluid may enhance sealing between other components within the circumferential seal assembly 30.

Referring again to FIG. 15, fluid from the higher pressure side 36 passes through an annular opening between the rotatable element 52 and each of the retaining ring 42 and the back plate 41. One portion of the fluid then passes between the back plate 41 and the third sealing ring 33 before entering the first cavity 53. This fluid then passes across the sealing interface between the third sealing ring 33 and the inward flange 27 of the insert 34. Another portion of the fluid passes across the sealing interface between the third sealing ring 33 and the cylindrical portion 105 of the second sealing ring 32. The portions recombine before passing across the sealing interface between the inward flange 27 and the cylindrical portion 105. Thereafter, the fluid passes between the ring portion 104 of the second sealing ring 32 and the inward flange 27 and then passes across the sealing interface between the ring portion 104 and the annular ring portion 118 of the insert 34 before entering the second cavity 54. In preferred embodiments, the flow rate, if any, between the first cavity 53 and the second cavity 54 is substantially less than the flow rate across other portions of the circumferential seal assembly 30.

Referring again to FIG. 15, other fluid passes along the annular gap 100 between the cylindrical portion 105 and the rotatable element 52 and enters the feed channel 110 at the inner surface of the cylindrical portion 105. The fluid passes through the feed channel 110 and exits the second sealing ring 32 at the interface with the primary sealing ring 31. The fluid passes into the first channel 66 and then passes through the primary sealing ring 31. One portion of this fluid is directed onto the housing 35 at the face sealing surface 46. The fluid at the face sealing surface 46 is further divided so that a portion enters the second cavity 54, exits the second cavity 54, and enters the lower pressure side 37 via the exhaust port 49 and so that another portion passes between the windback 44 and the rotatable element 52 before entering the lower pressure side 37. Another portion of the fluid enters the second channel 69 via the first channel 66 and is directed onto the radial sealing surface 46.

Referring again to FIG. 15, fluid from the second channel 69 impinges a pad 71 along the radial sealing surface 45 and then the fluid is directed in part toward the lower pressure side 37 so as to pass between the windback 44 and the rotatable element 52 before entering the lower pressure side 37 and in another part toward the higher pressure side 36 before combining within an annular groove 73 with counterflowing fluid passing between the rotatable element 52 and each of the seal bore dam 48, another annular groove 73, and the flow deflector 112. A portion of the counterflowing fluid may traverse a slot 119 along the pad 71 before entering the lower pressure side 37. The combined fluid within the annular groove 73 enters the vent channel 63 and passes through the primary sealing ring 31 before entering the second cavity 54. The outer circumferential surface 103 may include optional grooves to enhance sealing along the rotatable element 52. It is understood that some embodiments of the disclosure in FIG. 15 or other drawing herein may realize additional improvements by inclusion of hydrostatic lift via one or more features such as illustrated by way of the non-limiting example in FIG. 10a and/or by inclusion of hydrodynamic lift via one or more features such as illustrated by way of the non-limiting example in FIG. 11a.

Figure 16:
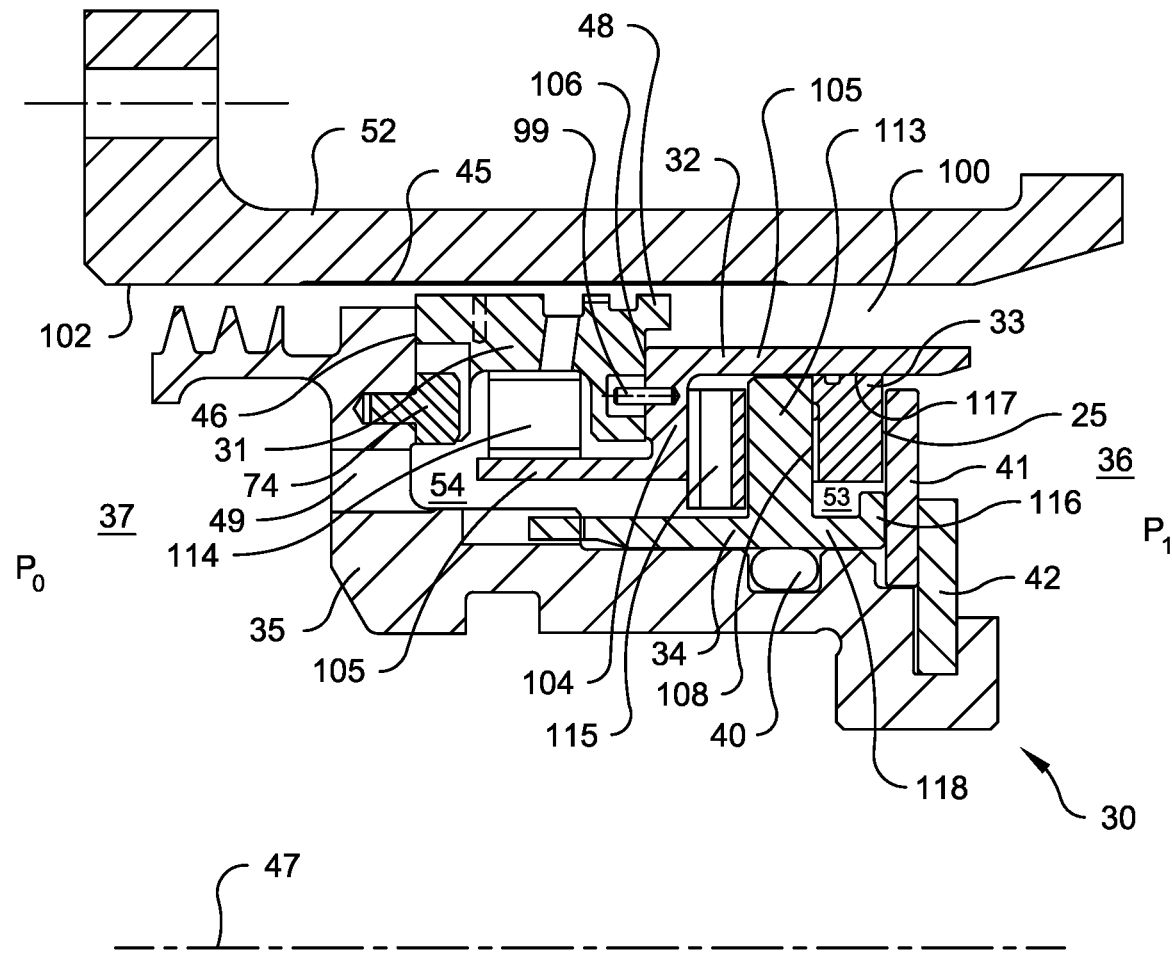
FIG. 16 is an enlarged cross-section view illustrating a circumferential seal assembly including a primary sealing ring, a second sealing ring, a third sealing ring, and an insert disposed within a housing which define and separate a first cavity and a second cavity whereby a seal is formed along an inner circumferential surface of a rotatable element via the primary sealing ring, the second sealing ring sealingly engages a face surface of the primary sealing ring, and the third sealing ring sealingly engages an inner cylindrical surface of the second sealing ring in accordance with an embodiment of the disclosure.

Referring now to FIG. 16, the circumferential seal assembly 30 is shown disposed within a rotatable element 52 rotatable about a rotational axis 47. The rotatable element 52 is disposed about the circumferential seal assembly 30 between a higher pressure side 36 and a lower pressure side 37 so that the primary sealing ring 31 sealingly engages the inner circumferential surface 102 of the rotatable element 52 along a region referred to as the radial sealing surface 45.

Referring again to FIG. 16, the circumferential seal assembly 30 generally comprises a primary sealing ring 31, a second sealing ring 32, a third sealing ring 33, and an insert 34. The primary sealing ring 31 is positioned within the housing 35 so that one face of the primary sealing ring 31 sealingly engages the face sealing surface 46 and the outer circumferential surface of the primary sealing ring 31 sealingly engages the radial sealing surface 45. The outer circumferential surface of the primary sealing ring 31 includes a seal bore dam 48 and other features which improve sealing with the rotatable element 52. The primary sealing ring 31 may include one or more other features described herein from other embodiments of the disclosure.

Referring again to FIG. 16, the second sealing ring 32 includes a pair of cylindrical portions 105 disposed about and extending from a ring portion 104. The primary sealing ring 31 is disposed about one cylindrical portion 105. This arrangement places the primary sealing ring 31 radially between the cylindrical portion 105 and the rotatable element 52. The second sealing ring 32 may include one or more other features described herein from other embodiments of the disclosure.

Referring again to FIG. 16, one or more springs 114 may be radially interposed between and may contact the cylindrical portion 105 and the primary sealing ring 31. One spring 114 is adapted for use in preferred embodiments, one non-limiting example being a compression-type element. The spring 114 at one end contacts and biases segments of the primary sealing ring 31 toward the rotatable element 52 so as to sealingly engage the radial sealing surface 45. The spring 114 at another end contacts the cylindrical portion 105. In these embodiment, the spring(s) 114 pushes the segments comprising the primary sealing ring 31 outward so that the primary sealing ring 31 favors expansion rather than contraction.

Referring again to FIG. 16, the insert 34 in some embodiments may be integral with the housing 35 or in other embodiments a separate component from the housing 35. The insert 34 includes an annular ring portion 118 with an outward flange 113 radially extending outward therefore. The annular ring portion 118 contacts the housing 35 with an optional O-ring 40 therebetween when not integral to the housing 35. The outward flange 113 is oriented in the direction of the other cylindrical portion 105 and the rotatable element 52. This arrangement places the outward flange 113 radially between the annular ring portion 118 and the other cylindrical portion 105 and the other cylindrical portion 105 radially between the outward flange 113 and the rotatable element 52. An annular gap 100 is disposed between and separates the other cylindrical portion 105 and the rotatable element 52. The outer end of the outward flange 113 may sealingly engage an inner cylindrical surface 117 of the other cylindrical portion 105. The insert 34 may include one or more other features described herein from other embodiments of the disclosure.

Referring again to FIG. 16, the third sealing ring 33 is axially interposed between the outward flange 113 and a back plate 41. The back plate 41 may be secured to the housing 35 via a retaining ring 42. The back plate 41 may also contact the annular ring portion 118 adjacent to an optional extraction flange 116 which extends outward from the annular ring portion 118. In preferred embodiments, the outward flange 113 and the back plate 41 form a pocket for the third sealing ring 33. The third sealing ring 33 sealingly engages the flange face 108 of the outward flange 113. The third sealing ring 33 is positioned within the pocket to permit fluid to pass between the third sealing ring 33 and the back plate 41. The third sealing ring 33 is positioned so as to sealingly engage the inner cylindrical surface 117 of the other cylindrical portion 105. In preferred embodiments, the arrangement between the insert 34 and each of the primary sealing ring 31 and the third sealing ring 33 requires the cylindrical portion 105 adjacent to the primary sealing ring 31 to be diametrically smaller than the other cylindrical portion 105 adjacent to the third sealing ring 33. The third sealing ring 33 may include one or more other features described herein from other embodiments of the disclosure.

Referring again to FIG. 16, the insert 34 and the third sealing ring 33 are configured to cooperate to surround a region referred to as a first cavity 53. In preferred embodiments, the first cavity 53 is generally defined by the optional extraction flange 116, the annular ring portion 118, and the outward flange 113 of the insert 34 and by the third sealing ring 33. The first cavity 53 is communicable with the higher pressure side 36. A gap 25 between the third sealing ring 33 and the back plate 41 permits fluid from the higher pressure side 36 to enter the first cavity 53.

Referring again to FIG. 16, the primary sealing ring 31, the second sealing ring 32, the insert 34, and the housing 35 are configured to cooperate to enclose a region referred to as a second cavity 54. In preferred embodiments, the primary sealing ring 31 sealingly engages the housing 35 and the second sealing ring 32 and the insert 34 sealingly engages the second sealing ring 32 and the housing 35 about the second cavity 54. The second cavity 54 is communicable with the lower pressure side 37 via at least one exhaust port 49 along the housing 35. The exhaust port 49 is a hole through the housing 35 which permits exchange of fluid between the second cavity 54 and the lower pressure side 37.

Referring again to FIG. 16, the second sealing ring 32 and the insert 34 are disposed between and separate the first cavity 53 and the second cavity 54. In preferred embodiments, the cylindrical portion 105 cooperates with the outer end of the outward flange 113 to prevent and/or to minimize mixing of fluids at the higher pressure side 36 and the first cavity 53 and fluids at the lower pressure side 37 and the second cavity 54.

Referring again to FIG. 16, one or more springs 115 may be axially disposed between and contact the ring portion 104 of the second sealing ring 32 and the outward flange 113 of the insert 34. One spring 115 is adapted for use in preferred embodiments, one non-limiting example being a wave-type element. The spring 115 at one end biases the face of the ring portion 104 to sealingly engage the face surface 106 of the primary sealing ring 31. The spring 115 at another end biases the annular ring portion 118 to sealingly engage the third sealing ring 33 and the extraction flange 116 to sealingly engage the back plate 41. The arrangement of the second sealing ring 32 and the insert 34 with or without the spring(s) 115 ensures separation between the first cavity 53 and the second cavity 54 thereby preventing fluids originating in the higher pressure side 36 from bypassing and negating the sealing function of the circumferential seal assembly 30. However, it is understood that fluid may slowly bleed across the circumferential seal assembly 30 as permitted by features of the design.

Referring again to FIG. 16, optional retaining pins 99 may extend at one end into the primary sealing ring 31 and extend at another end into the second sealing ring 32 about the interface therebetween. The retaining pins 99 engage cavities along the sealing segments so that the retaining pins 99 hold the segments in place radially with respect to the second sealing ring 32. Optional anti-rotation pins 74 may be secured to the seal housing 35 adjacent to the face sealing surface 46 and positioned to engage pockets along a face of the primary sealing ring 31. Both retaining pins 99 and anti-rotation pins 74 should permit the primary sealing ring 35 to expand and contract as required to ensure proper sealing at the radial sealing surface 45.

Figure 17:
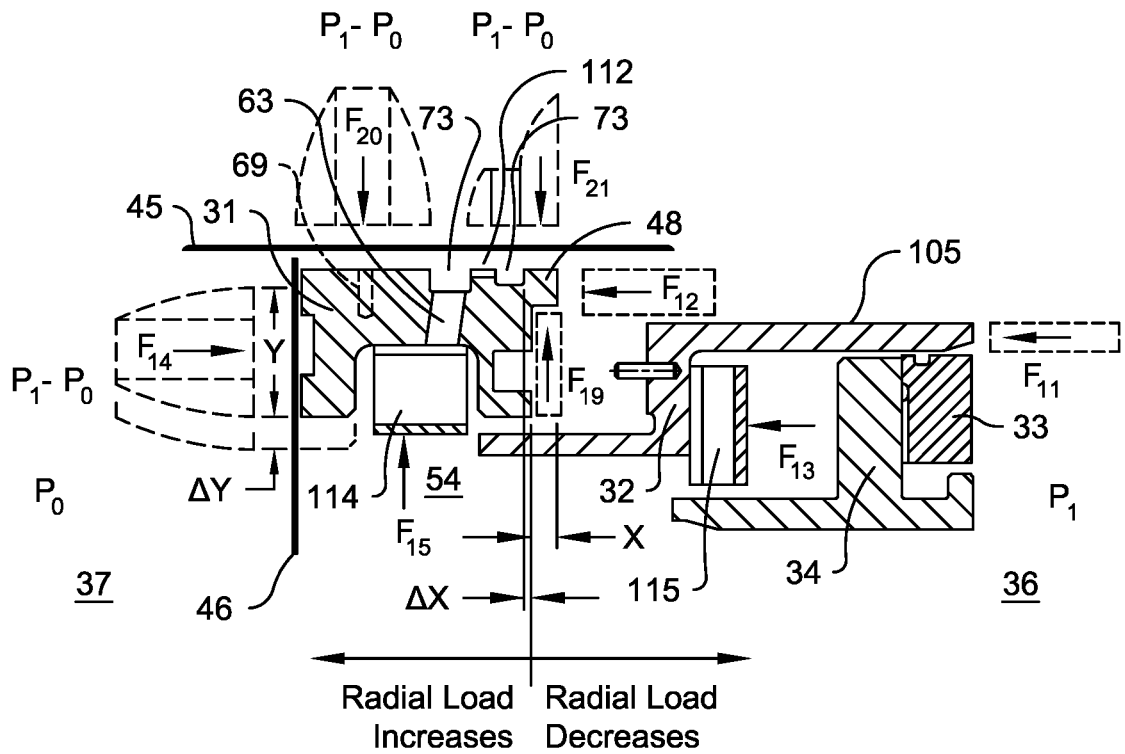
FIG. 17 is an exploded cross-section view illustrating pressures and resultant forces within a circumferential seal assembly for sealing an inner circumferential surface of a rotatable element in accordance with an embodiment of the disclosure.

Referring now to FIGS. 17 and 16, pressures and pressure forces are illustrated, by way of a non-limiting example, along a primary sealing ring 31 configured to sealingly engage both the radial sealing surface 45 and the face sealing surface 46 wherein the radial sealing surface 45 is along an inner circumferential surface 102 of the rotatable element 52. The pressure loading is generally understood to be the pressure differential across the circumferential seal assembly 30 ($P_1 - P_0$) with applicable decay due to leakage where $P_1$ is the pressure within the higher pressure side 36 and $P_0$ is the pressure within the lower pressure side 37.

Referring again to FIGS. 17 and 16, the resultant force load at the radial sealing surface 45 is equivalent to the total of the spring force $F_{15}$ and the outward radial pressure force $F_{19}$ less the total of the inward radial pressure forces $F_{20}$, $F_{21}$. The spring force $F_{15}$ is applied onto the primary sealing ring 31 via the spring(s) 114. The outward radial pressure force $F_{19}$ is applied onto the primary sealing ring 31 adjacent to the second sealing ring 32 by fluid from the higher pressure side 36 acting on the primary sealing ring 31. The inward radial pressure forces $F_{20}$, $F_{21}$ are applied onto the primary sealing ring 31 by fluid adjacent to the second channel 69 and by fluid acting at the flow deflector 112, the annular groove 73, and the seal bore dams 48. The flow deflector 112 is a bore dam with multiple shallow thru slots to reduce the pressure in the first annular groove 73. The pressure seating force is negligible within the second annular groove 73 because of the pressure breakdown permitted by vent channels 63 through the primary sealing ring 31 which allows fluid to exit the second annular groove 73 and enter the second cavity 54.

Referring again to FIGS. 17 and 16, the resultant force load at the face sealing surface 46 is equivalent to the total of the aft axial pressure forces $F_{11}$, $F_{12}$ and the spring force $F_{13}$ less the forward axial pressure force $F_{14}$. The aft axial pressure force $F_{11}$ is indirectly applied onto the primary sealing ring 31 via fluid originating from the higher pressure side 36 which acts on the cylindrical portion 105 of the second sealing ring 32. The aft axial pressure force $F_{12}$ is directly applied onto the primary sealing ring 31 adjacent to the seal bore dam 48 by fluid originating from the higher pressure side 36. The spring force $F_{13}$ is indirectly applied onto the primary sealing ring 31 via the spring(s) 115 acting on the second sealing ring 32. The forward axial pressure force $F_{14}$ is applied onto the primary sealing ring 31 by fluid communicated onto the face sealing surface 46 via the first channel(s) 66.

Referring again to FIGS. 17 and 16, the resultant pressure seating force at the radial sealing surface 45 is adjusted via adjustments to the primary sealing ring 31 adjacent to the seal bore dam 48. The resultant pressure seating force decreases when the seal face surface 106 is adjusted in the direction of the higher pressure side 36. The resultant pressure seating force increases when the seal face surface 106 is adjusted in the direction of the lower pressure side 37.

Referring again to FIGS. 17 and 16, the resultant pressure seating force at the face sealing surface 46 is adjusted via adjustments to the primary sealing ring 31 adjacent to the face sealing surface 46. The resultant pressure seating force decreases when the primary sealing ring 31 is adjusted inward. The resultant pressure seating force increases when the primary sealing ring 31 is adjusted outward.

Figure 18:
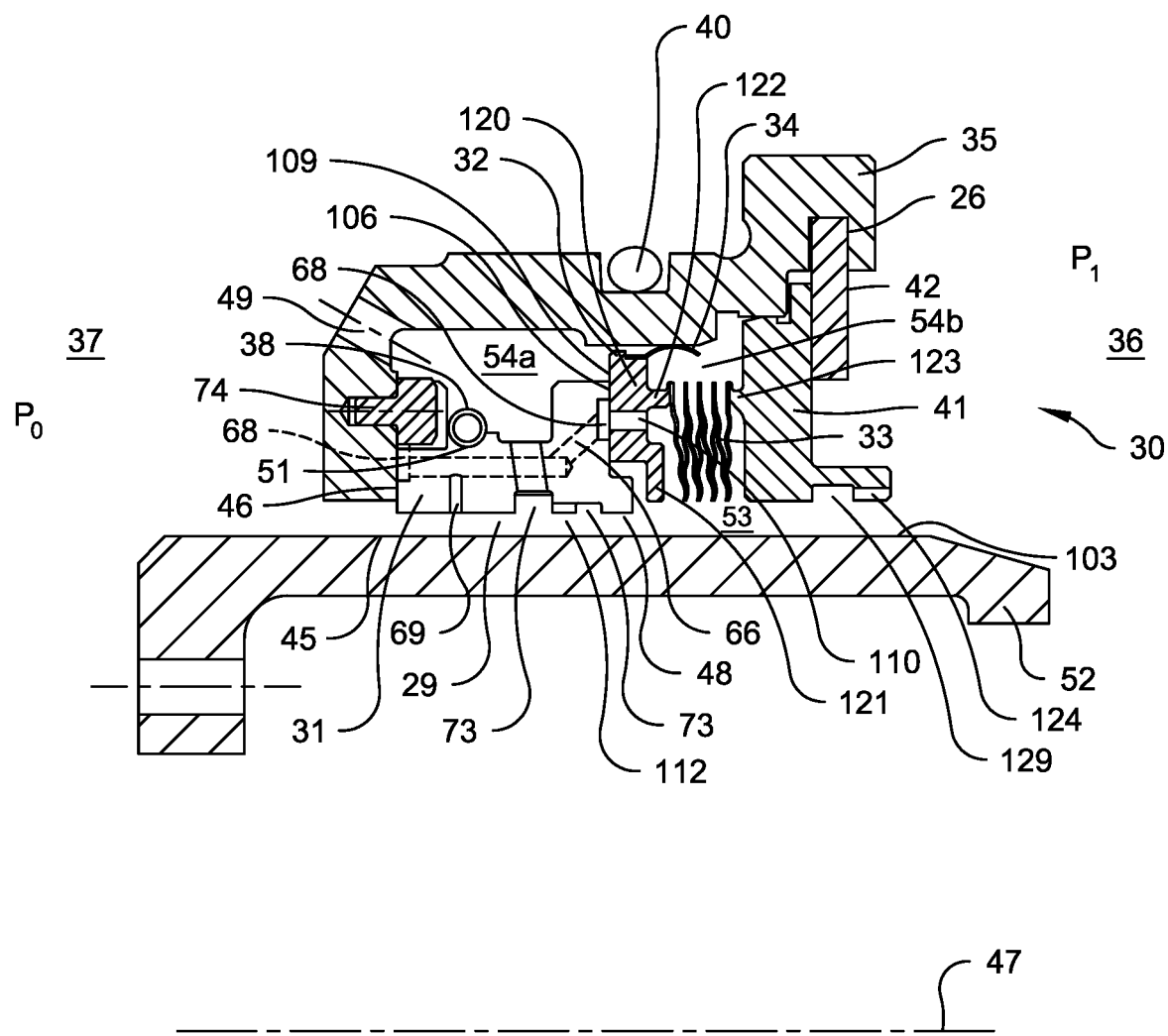
FIG. 18 is an enlarged cross-section view illustrating a circumferential seal assembly including a primary sealing ring, a second sealing ring, a third sealing ring, and an insert disposed within a housing which define and separate a first cavity and a second cavity whereby a seal is formed along an outer circumferential surface of a rotatable element via the primary sealing ring, the second sealing ring sealingly engages a face surface of the primary sealing ring, and a third sealing ring is a bellows-type seal in contact with the second sealing ring in accordance with an embodiment of the disclosure.

Referring now to FIG. 18, a circumferential seal assembly 30 is shown disposed within a housing 35 about a rotatable element 52. The circumferential seal assembly 30 generally comprises a primary sealing ring 31, a second sealing ring 32, a third sealing ring 33, and an insert 34. Components for the circumferential seal assembly 30 are secured within the housing 35 preferably via securing means understood in the art, non-limiting examples including a back plate 41 and a retaining ring 42. Components of the circumferential seal assembly 30 are composed of materials suitable for the intended applications, examples including but not limited to metals, ceramics, and non-metals, one non-limiting example being carbon graphite.

Referring again to FIG. 18, the circumferential seal assembly 30, the housing 35, and the rotatable element 52 are aligned along and disposed about a rotational axis 47, often coinciding with the rotational axis within a turbine engine. The rotatable element 52 is broadly defined to include a rotatable shaft or the like with or without elements extending therefrom, one non-limiting example being a runner.

Referring again to FIG. 18, the circumferential seal assembly 30, the housing 35, and the rotatable element 52 generally cooperate to define and to separate a higher pressure side 36 and a lower pressure side 37. The housing 35 is attached to structural components (not shown) of a turbine engine via methods understood in the art so as to secure the circumferential seal assembly 30 therein. In this arrangement, the circumferential seal assembly 30 and the housing 35 are non-rotating. The configuration of the housing 35 is design dependent; however, it is understood for purposes of the present disclosure that the housing 35 cooperates with the circumferential seal assembly 30 and the rotatable element 52 to define two separate compartments whereby one fluid, such as a lubricant, resides at a lower pressure within a compartment coinciding with the lower pressure side 37 and another fluid, such as a gas, resides at a higher pressure within a compartment coinciding with the higher pressure side 36. An O-ring 40 may be positioned between the housing 35 and other component(s) adjacent to the housing 35.

Referring again to FIG. 18, the primary sealing ring 31 is disposed within the housing 35 so as to sealingly engage the rotatable element 52 along an outer surface thereof over a region referred to as the radial sealing surface 45. While the radial sealing surface 45 is shown along the outer circumferential surface 103 of the rotatable element 52, it is understood that the radial sealing surface 45 may be disposed along the inner surface of a rotatable element 52 in other embodiments of the disclosure. The primary sealing ring 31 also sealingly engages an inside surface along the housing 35 over a region referred to as a face sealing surface 46 adjacent to the lower pressure side 37. It is further understood that the face sealing surface 46 may be adjacent to an optional windback 44, such as shown in FIG. 13, which extends from the housing 35 into the lower pressure side 37. Sealing engagement is generally understood to mean a non-contact arrangement and/or a contact arrangement that limits, prevents, or controls the flow of fluids between the higher pressure side 36 and the lower pressure side 37. In preferred embodiments, sealing engagement may be implemented via a thin-film fluid layer. In one specific example, the thin-film layer may be disposed along a gap 29 between the primary sealing ring 31 and the rotatable element 52.

Referring again to FIG. 18, the primary sealing ring 31 has an outer surface and an inner surface. The outer circumferential surface of the primary sealing ring 31 includes a spring groove 51. The spring groove 51 accepts a garter spring 38 which urges or biases the primary sealing ring 31 in the direction of the radial sealing surface 45. The inner circumferential surface of the primary sealing ring 31 includes a seal bore dam 48 and an annular groove 73. In preferred embodiments, the seal bore dam 48 is biased toward the second sealing ring 32 and away from the housing 35. In some embodiments, the primary sealing ring 31 may include a second annular groove 73 with a flow deflector 112 interposed between the paired arrangement of annular grooves 73. The primary sealing ring 31 may include one or more other features described herein from other embodiments of the disclosure.

Referring now to FIGS. 18, 20a, 20b, and 20c, the insert 34 is radially interposed between the second sealing ring 32 and the housing 35. The insert 34 in some embodiments may be integral with the housing 35 or in other embodiments a separate component from the housing 35. The insert 34 contacts and may sealingly engage the second sealing ring 32, preferably at the outer diameter surface, and/or of the housing 35, preferably at the inner diameter surface. The insert 34 is elastically responsive in part or whole so as to accommodate movement within the circumferential seal assembly 30.

Referring again to FIGS. 18, 20a, 20b, and 20c, the insert 34 may include a first portion 125 and a second portion 126. The first portion 125 is configured to sealingly engage and support the second sealing ring 32. In some preferred embodiments, the first portion 125 is an annular element 127, either ring shaped or cylindrically shaped, securable to the second sealing ring 32. The second portion 126 extends from the first portion 125. The second portion 126 is configured to sealingly engage the housing 35 so as to properly align the second sealing ring 32 with respect to the primary sealing ring 31 and the third sealing ring 33. In other preferred embodiments, the second portion 126 may include a plurality of finger springs 128. A finger spring 128 may be non-linear and non-planar shaped; however, other shapes and designs are possible. The finger springs 128 may cooperate to form a scalloped-shaped structure with a gap between adjacent finger springs 128 such as illustrated by the non-limiting example in FIG. 20b. In preferred embodiments, each finger spring 128 is elastically responsive so as to accommodate movement of a component(s) within the circumferential seal assembly 30, one non-limiting example being the second sealing ring 32. The insert 34 may move, in use, along the inner diameter of the housing 35 as the second sealing ring 32 axially translates within the housing 35. In some embodiments, the finger springs 128 may inwardly move as the insert 34 is inserted into the housing 35 during assembly, thereby reducing the gap between adjacent finger springs 128. The arrangement of the finger springs 128 in the assembled form of the circumferential seal assembly 30 may complement, supplement, and/or augment other sealing features of the insert 34. The insert 34 may include one or more other features described herein from other embodiments of the disclosure.

Referring again to FIG. 18, the second sealing ring 32 includes a ring portion 120 with an optional lower end 121 extending therefrom, the latter positioned to overlap a portion of the face side of the seal bore dam 48. The second sealing ring 32, and more particularly the ring portion 120, sealingly engages a face surface 106 of the primary sealing ring 31. In preferred embodiments, the second sealing ring 32 is a ring-shaped element. The second sealing ring 32 may include one or more other features described herein from other embodiments of the disclosure.

Referring again to FIG. 18, the third sealing ring 33 is axially interposed between the second sealing ring 32 and the back plate 41. This and other arrangements radially interpose the primary sealing ring 31, the second sealing ring 32, and the third sealing ring 33 between the housing 35 and the rotatable element 52. The third sealing ring 33 at one end sealingly engages a face side of the second sealing ring 32 and at another end sealingly engages a face side of the back plate 41. In preferred embodiments, the third sealing ring 33 is separately secured to the second sealing ring 32 and to the back plate 41. In a non-limiting example, the third sealing ring 33 may be secured via means understood in the art at one end to a ring-shaped aft extension 122 at a face of the second sealing ring 32 and at another end to a ring-shaped forward extension 123 at a face of the back plate 41. In preferred embodiments, the third sealing ring 33 should allow for expansion and contract of the distance between the second sealing ring 32 and the back plate 41. In one non-limiting example, the third sealing ring 33 may be a bellows-type seal. In some embodiments, the third sealing ring 33 may communicate a force onto the second sealing ring 32 which axially biases the second sealing ring 32 in the direction of the primary sealing ring 31. In other embodiments, the primary sealing ring 31 may be axially biased toward the face sealing surface 46 via the second sealing ring 32 when the third sealing ring 33 communicates a biasing force onto the second sealing ring 32. Optional anti-rotation pins 74 may be secured to the seal housing 35 adjacent to the face sealing surface 46 and positioned to engage pockets along a face of the primary sealing ring 31. The third sealing ring 33 may include one or more other features described herein from other embodiments of the disclosure.

Referring again to FIG. 18, the housing 35 may include a groove 26 which accepts the retaining ring 42. The back plate 41 is a ring-shaped element disposed between the retaining ring 42 and the third sealing ring 33. Two or more axial slots 124 and a groove 129 may reside along the inner diameter surface of the back plate 41 to facilitate assembly and disassembly. The axial slots 124 intersect the groove 129 so as to allow tabs extending from an extraction fixture to engage the inner diameter of the back plate 41. The fixture is rotated and aftwardly pulled to remove the back plate 41 from the housing 35. In preferred embodiments, the outer diameter of the back plate 41 has an interference fit with the inner diameter within the housing 35 to seal the interface therebetween.

Referring again to FIG. 18, the primary sealing ring 31, the second sealing ring 32, and the third sealing ring 33 are configured to cooperate to surround a region, referred to as a first cavity 53, adjacent to and about the rotatable element 52. In preferred embodiments, the first cavity 53 is generally defined by the aft face of the primary sealing ring 31, the inner diameter surface and the aft face of the second sealing ring 32, and the inner diameter surface of the third sealing ring 33. The first cavity 53 is communicable with the higher pressure side 36 via flow along the interface between the rotatable element 52 and the back plate 41.

Referring again to FIG. 18, the primary sealing ring 31, the second sealing ring 32, the third sealing ring 33, and the housing 35 are configured to cooperate to enclose a region referred to as a second cavity 54. The insert 34 contacts the second sealing ring 32 and the housing 35 so as to separate a first part of the second cavity 54a and a second part of the second cavity 54b. In preferred embodiments, the second cavity 54 is generally defined by the faces and the outer diameter surface of the second sealing ring 32, the outer circumferential surface of the primary sealing ring 31, the inner surface of the housing 35, and the outer surface of the third sealing ring 33. The first part of the second cavity 54a is directly communicable with the lower pressure side 37 via at least one exhaust port 49 along the housing 35. The exhaust port 49 is a hole traversing the housing 35 which permits exchange of fluid between the second cavity 54 and the lower pressure side 37. In preferred embodiments, air leakage between the first cavity 53 and the second cavity 54 is minimized to reduce fluid leakage.

Referring again to FIG. 18, the primary sealing ring 31, the second sealing ring 32, and the third sealing ring 33 are interposed between the first cavity 53 and the second cavity 54. In preferred embodiments, the primary sealing ring 31, the second sealing ring 32, and the third sealing ring 33 cooperate with the rotatable element 52 to prevent and/or to minimize mixing of fluid from the first cavity 53 and fluid from the second cavity 54. This arrangement separates the first cavity 53 and the second cavity 54 thereby preventing fluids originating in the higher pressure side 36 from bypassing and negating sealing function by the circumferential seal assembly 30. However, it is understood that fluid may slowly bleed across the circumferential seal assembly 30 as permitted by features of the design.

Referring again to FIG. 18, the primary sealing ring 31 includes two or more seal segments which in combination form a ring-shaped structure referred to as a segmented ring. In preferred embodiments, the primary sealing ring 31 and the second sealing ring 32 may include features therethrough which permit fluid at the higher pressure side 36 to flow to the face sealing surface 46 and the radial sealing surface 45. This fluid may be utilized to form and/or to maintain a thin-film seal between the primary sealing ring 31 and the housing 35 at the face sealing surface 46 and/or between the primary sealing ring 31 and the rotatable element 52 at the radial sealing surface 45. The primary sealing ring 31 may include one or more optional features described in FIGS. 3a-3g.

Referring again to FIG. 18, the second sealing ring 32 may include one or more feed channels 110. The feed channel 110 traverses the second sealing ring 32 from a face side to the interface 109. In preferred embodiments, each feed channel 110 is positioned so as to permit fluid at the higher pressure side 36 to enter the second sealing ring 32 via flow between the rotatable element 52 and the third sealing ring 33 and to exit the second sealing ring 32 onto the face surface 106 of the primary sealing ring 31.

Referring again to FIG. 18, the primary sealing ring 31 may include one or more first channels 66. In preferred embodiments, the first channel 66 completely traverses the primary sealing ring 31 from end-to-end thereby providing a pathway from one face of the primary sealing ring 31 to another face of the primary sealing ring 31. In other preferred embodiments, the first channel 66 intersects and communicates with a pocket 68 at one or both faces of the primary sealing ring 31. One continuous pocket 68 or two or more pockets 68 may reside along a face. The pocket(s) 68 at the face surface 106 communicates with the feed channel(s) 110 of the second sealing ring 32. One or more optional second channels 69 may intersect the first channel 66 within the primary sealing ring 31. The second channel(s) 69 permits a pathway from the first channel 66 to the inner diameter of the primary sealing ring 31. In other embodiments, the second channel(s) 69 communicates at one end with the slot(s) 68 to complete the pathway from the first channel 66. The number, arrangement, and dimensions of the first channel 66, the second channel 69, the pocket 68, and the feed channel 110 are design dependent based on the flow requirements at the radial sealing surface 45 and the face sealing surface 46.

Referring again to FIG. 18, a fluid in preferred embodiments enters the feed channel(s) 110 at one face of the second sealing ring 32. The fluid traverses the feed channel(s) 110 and is directed into the pocket(s) 68 along the face surface 106. The fluid then enters the first channel(s) 66 of the primary sealing ring 31 via the pocket(s) 68. The fluid traverses the primary sealing ring 31 via the first channel(s) 66. At least a portion of the fluid is communicated to pocket(s) 68 along the face of the primary sealing ring 31 adjacent to the face sealing surface 46 whereby the fluid forms a thin-film sealing layer between the housing 35 and the primary sealing ring 31. Another portion of the fluid is communicated onto the rotating element 52 via the second channel(s) 69 whereby the fluid forms a thin-film sealing layer along the gap 29 between the primary sealing ring 31 and the rotatable element 52.

Figure 19:
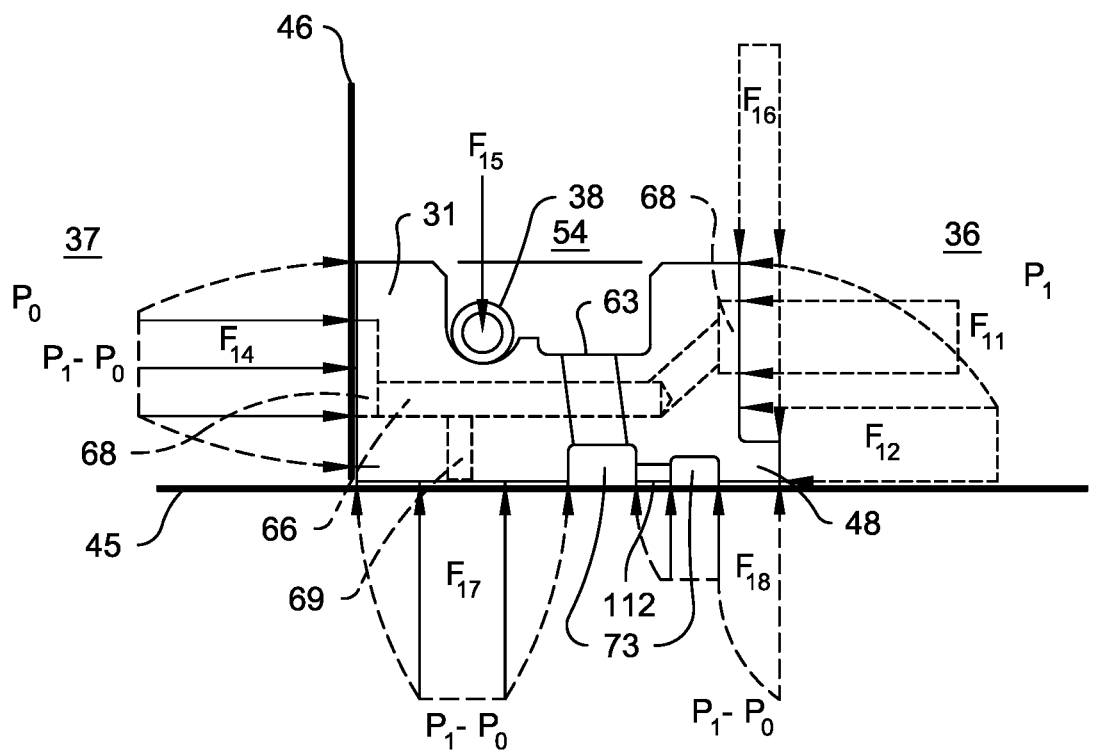
FIG. 19 is a cross-section view illustrating pressures and resultant forces within a circumferential seal assembly for sealing an outer circumferential surface of a rotatable element in accordance with an embodiment of the disclosure.

Referring now to FIGS. 19 and 18, pressures and pressure forces are illustrated, by way of a non-limiting example, along a primary sealing ring 31 configured to sealingly engage both the radial sealing surface 45 and the face sealing surface 46 wherein the radial sealing surface 45 is along an outer circumferential surface 103 of the rotatable element 52. The pressure loading is generally understood to be the pressure differential across the circumferential seal assembly 30 ($P_1$–$P_0$) with applicable decay due to leakage where $P_1$ is the pressure within the higher pressure side 36 and $P_0$ is the pressure within the lower pressure side 37.

Referring again to FIGS. 19 and 18, the resultant force load at the radial sealing surface 45 is equivalent to the total of the spring force $F_{15}$ and the inward radial pressure force $F_{16}$ less the total of the outward radial pressure forces $F_{17}$, $F_{18}$. The spring force $F_{15}$ is applied onto the primary sealing ring 31 via the garter spring 38. The inward radial pressure force $F_{16}$ is applied onto the primary sealing ring 31 by fluid from the higher pressure side 36. The outward radial pressure forces $F_{17}$, $F_{18}$ are applied onto the primary sealing ring 31 by fluid adjacent to the second channel 69 and by fluid acting at the flow deflector 112, the annular groove 73, and the seal bore dams 48. The flow deflector 112 is a bore dam with multiple shallow thru slots to reduce the pressure in the first annular groove 73. The pressure force is negligible within the second annular groove 73 because of the pressure breakdown permitted by a vent channel(s) 63 through the primary sealing ring 31 which allows fluid to exit the second annular groove 73 and enter the second cavity 54.

Referring again to FIGS. 19 and 18, the resultant force load at the face sealing surface 46 is equivalent to the total of the aft axial pressure forces $F_{11}$, $F_{12}$ less the forward axial pressure force $F_{14}$. The aft axial pressure force $F_{11}$ is directly applied onto the primary sealing ring 31 via fluid originating from the higher pressure side 36 which acts over the pocket 68 of the second sealing ring 32. The aft axial pressure force $F_{12}$ is directly applied onto the primary sealing ring 31 adjacent to the seal bore dam 48 by fluid originating from the higher pressure side 36 and by fluid communicated between the primary sealing ring 31 and the second sealing ring 32 via the feed channel 110. The forward axial pressure force $F_{14}$ is applied onto the primary sealing ring 31 by fluid communicated onto the face sealing surface 46 via the first channel(s) 66 and the pocket(s) 68.

Referring again to FIGS. 19 and 18, the resultant pressure seating force at the radial sealing surface 45 is adjusted via adjustments to the primary sealing ring 31 adjacent to the seal bore dam 48. The resultant pressure seating force decreases when the seal face surface 106 is adjusted in the direction of the higher pressure side 36. The resultant pressure seating force increases when the seal face surface 106 is adjusted in the direction of the lower pressure side 37.

Referring again to FIGS. 19 and 18, the resultant pressure seating force at the face sealing surface 46 is adjusted via adjustments to the primary sealing ring 31 adjacent to the face sealing surface 46. The resultant pressure seating force decreases when the primary sealing ring 31 is adjusted outward. The resultant pressure seating force increases when the primary sealing ring 31 is adjusted inward.

The disclosure may be used within a variety of applications wherein circumferential sealing is required about a rotating surface to prevent migration of a fluid from one compartment into another compartment. Specific non-limiting examples are a turbine engine or an industrial equipment wherein a seal assembly is disposed along a rotatable/translatable shaft or a runner between a compartment with a first fluid and a compartment with a second fluid whereby mixing of the fluids would be detrimental to function of the engine or the equipment.

The description above indicates that a great degree of flexibility is offered in terms of the present disclosure. Although various embodiments have been described in considerable detail with reference to certain preferred versions thereof, other versions are possible. Therefore, the spirit and scope of the appended claims should not be limited to the description of the preferred versions contained herein.

What is claimed is:

1. A circumferential seal assembly for use between a higher pressure side and a lower pressure side comprising:
   (a) a primary sealing ring radially interposed between a housing and a rotatable element, said primary sealing ring at a first end sealingly engages a face sealing surface along said housing, said primary sealing ring sealingly engages a radial sealing surface along an outer circumferential surface of said rotatable element;
   (b) a second sealing ring radially interposed between said housing and said rotatable element, said second sealing ring comprises a ring portion and a cylindrical portion, said ring portion sealingly engages a face surface at a second end of said primary sealing ring;
   (c) a third sealing ring sealingly engages said cylindrical portion; and
   (d) an insert comprises an inward flange extending from an annular ring portion, said inward flange axially interposed between said ring portion and said third sealing ring, said third sealing ring radially interposed between said annular ring portion and said cylindrical portion, said third sealing ring sealingly engages a flange face of said inward flange;
   wherein:
      said insert and said third sealing ring define a first cavity;
      said primary sealing ring, said second sealing ring, and said housing define a second cavity;
      said insert and said second sealing ring cooperate to separate said first cavity and said second cavity.

2. The circumferential seal assembly of claim 1, wherein said rotatable element being a shaft.

3. The circumferential seal assembly of claim 1, wherein said rotatable element being a runner.

4. The circumferential seal assembly of claim 1, wherein, in use, said first cavity is suitable to be at a higher pressure and said second cavity is suitable to be at a lower pressure.

5. The circumferential seal assembly of claim 1, wherein said primary sealing ring includes a seal bore dam which sealingly engages said radial sealing surface adjacent to said second sealing ring.

6. The circumferential seal assembly of claim 1, wherein said housing includes at least one exhaust port which permits a fluid, in use, to exit said second cavity.

7. The circumferential seal assembly of claim 1, wherein said primary sealing ring comprises a carbon.

8. The circumferential seal assembly of claim 1, wherein said second sealing ring comprises a metal.

9. The circumferential seal assembly of claim 1, wherein said third sealing ring comprises one of a metal or a carbon.

10. The circumferential seal assembly of claim 1, wherein, in use, a fluid traverses said radial sealing surface adjacent to said second sealing ring before entering said second sealing ring.

11. The circumferential seal assembly of claim 10, wherein said fluid being communicated from said second sealing ring into said primary sealing ring whereafter said fluid being directed toward said face sealing surface.

12. The circumferential seal assembly of claim 10, wherein said fluid being communicated from said second sealing ring into said primary sealing ring whereafter said fluid being directed toward said radial sealing surface.

13. The circumferential seal assembly of claim 1, wherein, in use, a fluid enters said primary sealing ring adjacent to said radial sealing surface whereafter said fluid enters said second cavity.

14. The circumferential seal assembly of claim 1, wherein, in use, a fluid originating from said higher pressure side traverses said first cavity and passes between said third sealing ring and said insert and between said insert and said second sealing ring before entering said second cavity.

15. The circumferential seal assembly of claim 1, wherein said second sealing ring being axially biased in direction of said primary sealing ring via at least one spring.

16. The circumferential seal assembly of claim 15, wherein said primary sealing ring being axially biased toward said face sealing surface via said second sealing ring.

17. The circumferential seal assembly of claim 1, wherein said insert being integral with said housing.

18. A circumferential seal assembly for use between a higher pressure side and a lower pressure side comprising:
   (a) a second sealing ring comprises a ring portion interposed between a pair of cylindrical portions, said second sealing ring radially interposed between a housing and a rotatable element;
   (b) a primary sealing ring radially interposed between one said cylindrical portion and said rotatable element, said primary sealing ring at a first end sealingly engages a face sealing surface along said housing, said primary sealing ring sealingly engages a radial sealing surface along an inner circumferential surface of said rotatable element, said ring portion sealingly engages a face surface at a second end of said primary sealing ring;
   (c) a third sealing ring sealingly engages other said cylindrical portion; and
   (d) an insert comprises an outward flange extending from an annular ring portion, said outward flange axially interposed between said ring portion and said third sealing ring, said third sealing ring radially interposed between said annular ring portion and other said cylindrical portion, said third sealing ring sealingly engages a flange face of said outward flange;
   wherein:
      said insert and said third sealing ring define a first cavity;
      said primary sealing ring, said second sealing ring, said insert, and said housing define a second cavity;
      said insert and said second sealing ring cooperate to separate said first cavity and said second cavity.

19. The circumferential seal assembly of claim 18, wherein said rotatable element being a shaft.

20. The circumferential seal assembly of claim 18, wherein said rotatable element being a runner.

21. The circumferential seal assembly of claim 18, wherein, in use, said first cavity is suitable to be at a higher pressure and said second cavity is suitable to be at a lower pressure.

22. The circumferential seal assembly of claim 18, wherein said primary sealing ring includes a seal bore dam which sealingly engages said radial sealing surface adjacent to said second sealing ring.

23. The circumferential seal assembly of claim 18, wherein said housing includes at least one exhaust port which permits a fluid, in use, to exit said second cavity.

24. The circumferential seal assembly of claim 18, wherein said primary sealing ring comprises a carbon.

25. The circumferential seal assembly of claim 18, wherein said second sealing ring comprises a metal.

26. The circumferential seal assembly of claim 18, wherein said third sealing ring comprises one of a metal or a carbon.

27. The circumferential seal assembly of claim 18, wherein said second sealing ring being axially biased in direction of said primary sealing ring via at least one spring.

28. The circumferential seal assembly of claim 27, wherein said primary sealing ring being axially biased toward said face sealing surface via said second sealing ring.

29. The circumferential seal assembly of claim 18, wherein said insert being integral with said housing.

30. The circumferential seal assembly of claim 18, wherein said primary sealing ring being biased in direction of said radial sealing surface via at least one spring, said at least one spring radially interposed between one said cylindrical portion and said primary sealing ring.

31. The circumferential seal assembly of claim 30, wherein a plurality of retaining pins extend at one end into said primary sealing ring and at another end into said second sealing ring.

32. The circumferential seal assembly of claim 31, wherein said at least one spring permits proper alignment of said primary sealing ring to accept said retaining pins.

33. The circumferential seal assembly of claim 18, wherein a plurality of anti-rotation pins extend at one end into said primary sealing ring and at another end into said housing.

34. A circumferential seal assembly for use between a higher pressure side and a lower pressure side comprising:
(a) a primary sealing ring radially interposed between a housing and a rotatable element, said primary sealing ring at a first end sealingly engages a face sealing surface along said housing, said primary sealing ring sealingly engages a radial sealing surface along an outer circumferential surface of said rotatable element;
(b) a second sealing ring radially interposed between said housing and said rotatable element, said second sealing ring comprises a ring portion, said ring portion sealingly engages a face surface at a second end of said primary sealing ring;
(c) a third sealing ring radially interposed between said housing and said rotatable element, said third sealing ring sealingly engages said second sealing ring opposite said primary sealing ring, said second sealing ring being axially interposed between said primary sealing ring and said third sealing ring; and
(d) an insert radially interposed between and contacting said second sealing ring and said housing;
wherein:
said primary sealing ring, said second sealing ring, and said third sealing ring in cooperation with said rotatable element define a first cavity;
said primary sealing ring, said second sealing ring, said third sealing ring, in cooperation with said housing define a second cavity;
said primary sealing ring, said second sealing ring, and said third sealing ring cooperate to separate said first cavity and said second cavity.

35. The circumferential seal assembly of claim 34, wherein said rotatable element being a shaft.

36. The circumferential seal assembly of claim 34, wherein said rotatable element being a runner.

37. The circumferential seal assembly of claim 34, wherein, in use, said first cavity is suitable to be at a higher pressure and said second cavity is suitable to be at a lower pressure.

38. The circumferential seal assembly of claim 34, wherein said primary sealing ring includes a seal bore dam which sealingly engages said radial sealing surface adjacent to said second sealing ring.

39. The circumferential seal assembly of claim 34, wherein said housing includes at least one exhaust port which permits a fluid, in use, to exit said second cavity.

40. The circumferential seal assembly of claim 34, wherein said primary sealing ring comprises a carbon.

41. The circumferential seal assembly of claim 34, wherein said second sealing ring comprises a metal.

42. The circumferential seal assembly of claim 34, wherein said third sealing ring being a bellows seal.

43. The circumferential seal assembly of claim 42, wherein said second sealing ring being axially biased in direction of said primary sealing ring via said third sealing ring.

44. The circumferential seal assembly of claim 43, wherein said primary sealing ring being axially biased toward said face sealing surface via said second sealing ring.

45. The circumferential seal assembly of claim 44, wherein said third sealing ring being secured at one end to an aft extension of said second sealing ring and at other end to a forward extension of a back plate.

46. The circumferential seal assembly of claim 45, wherein said back plate being secured to said housing.

47. The circumferential seal assembly of claim 34, wherein said insert comprises a first portion with a second portion extending therefrom, said second portion being elastically responsive.

48. The circumferential seal assembly of claim 47, wherein said first portion being an annular element.

49. The circumferential seal assembly of claim 47, wherein said second portion comprises a plurality of finger springs.

50. The circumferential seal assembly of claim 47, wherein said insert separates a first part of said second cavity adjacent to said primary sealing ring and a second part of said second cavity adjacent to said third sealing ring, said second portion being adjacent to said second part.

51. The circumferential seal assembly of claim 34, wherein said insert being integral with said housing.

* * * * *